US010438030B2

(12) United States Patent
Ramon et al.

(10) Patent No.: US 10,438,030 B2
(45) Date of Patent: Oct. 8, 2019

(54) CONTAINER HOLDING FIXTURES

(71) Applicant: Amazon Technologies, Inc., Seattle, WA (US)

(72) Inventors: Nelson Andres Ramon, Seattle, WA (US); Matthew Bartol, Seattle, WA (US); James Gregory Martin, Seattle, WA (US); Allan Scott Bathurst, Seattle, WA (US); Will Seidelman, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/280,735

(22) Filed: Sep. 29, 2016

(65) Prior Publication Data
US 2018/0089474 A1 Mar. 29, 2018

(51) Int. Cl.
G06K 7/10 (2006.01)
G06K 7/14 (2006.01)
G06K 19/06 (2006.01)
G06K 19/077 (2006.01)
G06Q 10/08 (2012.01)
(Continued)

(52) U.S. Cl.
CPC ......... G06K 7/10316 (2013.01); B65G 1/137 (2013.01); B65G 1/1375 (2013.01); G06K 7/1413 (2013.01); G06K 19/06028 (2013.01); G06K 19/07758 (2013.01);
(Continued)

(58) Field of Classification Search
USPC ........................................................ 235/385
See application file for complete search history.

(56) References Cited

U.S. PATENT DOCUMENTS 5,505,473 A 4/1996 Radcliffe
7,225,980 B2 * 6/2007 Ku ................. G06K 7/0008
235/383
(Continued)

FOREIGN PATENT DOCUMENTS

JP 2010064823 3/2010

OTHER PUBLICATIONS

PCT/US2017/053608, "International Search Report and Written Opinion", dated Nov. 20, 2017, 11 pages.
(Continued)

Primary Examiner — Rafferty D Kelly
(74) Attorney, Agent, or Firm — Kilpatrick Townsend & Stockton LLP

(57) ABSTRACT

Apparatuses, systems, and methods are described that relate to location-based indications. An apparatus may include a frame, a sensing device, and a computing device. The frame may include a first set of members spaced apart and oriented in a first direction. At least one member of the first set of members may include an indicator area. The frame may also include a second set of members spaced apart and oriented in a second direction. At least two members of the second set of members may extend between the first set of members to define a container receiving area. The sensing device may be disposed adjacent to the container receiving area and configured to detect movement of containers with respective to the container receiving area. The computing device may be communicatively coupled to the sensing device and configured to cause presentation of indicators within the indicator area.

20 Claims, 17 Drawing Sheets

(51) Int. Cl.
  *B65G 1/137*   (2006.01)
  *G06Q 50/28*   (2012.01)
  *B62B 5/00*    (2006.01)

(52) U.S. Cl.
  CPC ........... *G06Q 10/087* (2013.01); *G06Q 50/28* (2013.01); *B62B 5/0096* (2013.01); *B65G 2209/06* (2013.01)

(56) References Cited

U.S. PATENT DOCUMENTS

| | | |
|---|---|---|
| 7,504,949 B1 | 3/2009 | Rouaix et al. |
| 7,924,161 B1 | 4/2011 | Spindel et al. |
| 8,301,294 B1 | 10/2012 | Shakes et al. |
| 8,798,784 B1 | 8/2014 | Clark et al. |
| 9,740,897 B1 | 8/2017 | Salour et al. |
| 2002/0081008 A1 | 6/2002 | Wollenweber |
| 2002/0190845 A1 | 12/2002 | Moore |
| 2006/0206235 A1 | 9/2006 | Shakes et al. |
| 2015/0005934 A1 | 1/2015 | Bell et al. |
| 2015/0081088 A1 | 3/2015 | Lyon et al. |
| 2015/0089980 A1 | 4/2015 | Maguire et al. |
| 2016/0180124 A1 | 6/2016 | Roth |

OTHER PUBLICATIONS

U.S. Appl. No. 15/280,716, filed Sep. 29, 2016, Titled: Generation and Presentation of Location-Based Indications.

PCT/US2017/053608 , "International Preliminary Report on Patentability", dated Apr. 11, 2019, 7 pages.

\* cited by examiner

CONTAINER HOLDING FIXTURES

BACKGROUND

Items may be moved throughout material handling facilities on moveable carts. Such moveable carts may be designed for human pushing and may be configured to hold multiple items. Human operators may place and remove items into and out of receptacles held by the moveable cart. These processes of placing and removing items may be performed as part of adding new items to a material handling facility, moving existing items to different locations in the material handling facility, and removing items from the material handling facility.

Existing moveable carts may include fixed receptacles. Use of these fixed receptacles may require unloading of items after items have been grouped into the receptacles and may require manually associating receptacles with inventory records or other groupings. This may lead to lower overall throughput because of the time required to unload items and time required to associate the receptacles. Throughput may also be negatively affected by the risk associated with misplacements (e.g., extra time devoted to careful checking of receptacles as part of item placement) and actual misplacements. Some existing moveable carts may include temporary receptacles that can be unloaded with the items remaining in the receptacles. While these temporary receptacles may address concerns over the time required to unload items, throughput may still be negatively affected as a result of the time required to associate the receptacles with the inventory records or other groupings, risks associated with misplacements, and actual misplacements.

BRIEF DESCRIPTION OF THE DRAWINGS

Various embodiments in accordance with the present disclosure will be described with reference to the drawings, in which.

DETAILED DESCRIPTION

Figure 1:
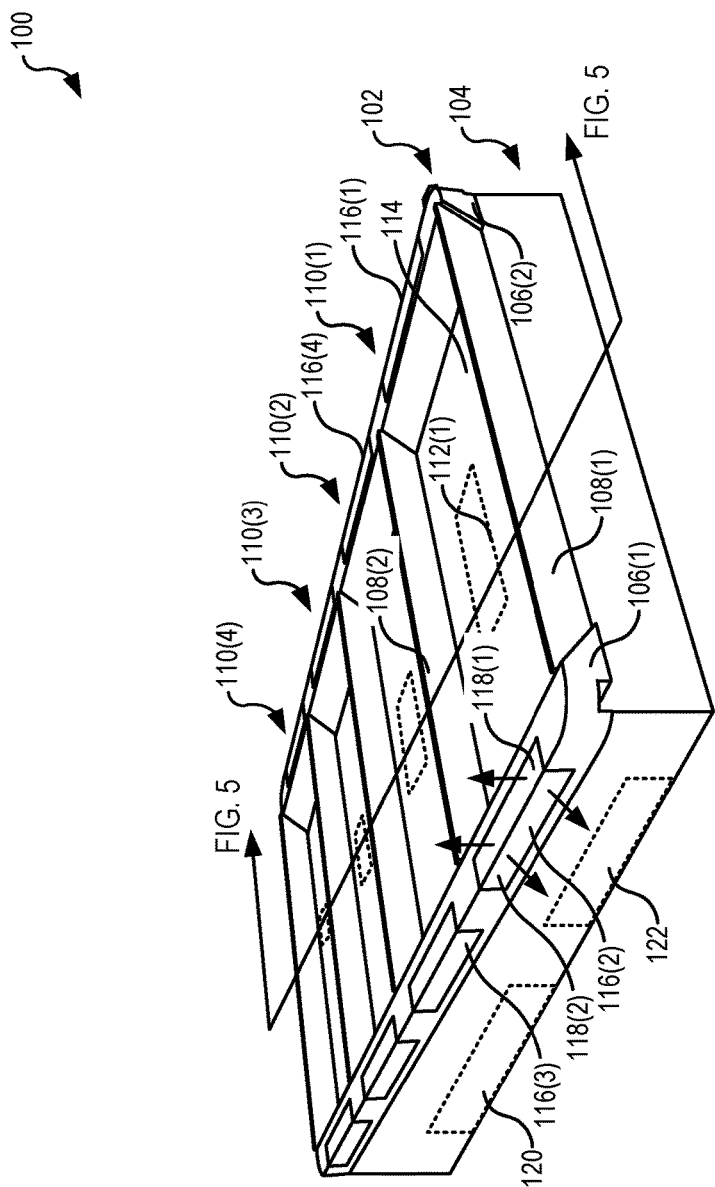
FIG. 1 illustrates a side perspective view of an example container holding fixture for use in generating and providing location-based indications, according to at least one example.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Examples described herein are directed to apparatuses, system, and techniques for generating and providing location-based indications. An example apparatus may include a container holding fixture that is configured to be received by a moveable cart. In particular, the container holding fixture may have a modular design in order to be easily installed and removed from the moveable cart. The moveable cart may be pushed by a human user as part of performing certain inventory tasks (e.g., picking items to fulfill a customer order, stowing inbound items, etc.) To this end, the container holding fixture may include a suitable number of divisions or slots to retain containers such as boxes, bags, or other receptacles capable of holding items. The human user may place items into and remove items from the containers as part of performing the inventory tasks. In order to alert the human user about a particular container from among multiple containers, each division or slot (where a container is held) may include an illuminating surface that includes an indicator such as a set of light-emitting diodes (LED). The indicators in the illuminating surfaces at the different divisions may be selectively illuminated in accordance with the techniques described herein depending on what information is being conveyed to the human user. For example, different indications can be provided as part of a process of associating a new container with a slot of the container holding fixture. In another example, different indications can be provided as part of a process of picking items from an inventory shelf and placing the items into the containers.

Turning now to a particular example, in this example, a container holding fixture is provided. The container holding fixture may be configured for releasable attachment with a moveable cart. This may be desirable because the moveable cart is also used for other tasks that would not benefit from the use of the container holding fixture. In any event, the container holding fixture includes a physical structure designed for receiving and retaining containers, a set of lighting devices, a set of sensors for sensing movement of containers and/or items, a reader device for controlling certain ones of the sensors, and a computing device for managing the operation of the reader device and the illumination devices and for communicating with other devices in an inventory management system. The physical structure of the container holding fixture includes a grid-like frame that defines a set of slots (e.g., container receiving areas). The frame also includes light areas disposed adjacent to each slot. The lighting devices are mounted in the light areas and configured to provide various visual indicators (e.g., blue, green, and red light emissions) in a predictable and controlled manner. For example, the light areas may diffuse light from the lighting devices upwardly and transversely away from the container holding fixture. The lighting devices may be selectively turned on and off (or alternated between different colors) by the computing device as determined by the computing device itself or as instructed by other computing devices (e.g., handheld scanner or inventory management system).

In another example, a method for associating containers with slots of a container holding fixture is provided. Indicators on the container holding fixture are used to identify slots (e.g., a slot where a human user should place a container), provide indication of successful task completion (e.g., a container successfully associated with a slot), and provide error feedback (e.g., a container detected at an improper or unexpected slot). This method may be used when each container is used separately to hold items. For example, a first container may be used to hold items associated with a first customer order, a second container may be used to hold items associated with a second customer order, and so forth. To begin to associate the first container with a first slot, a first indicator disposed at the first slot may be caused to present a first indication (e.g., a blue light). This may alert the human user to place the first container within the first slot. A sensor such as a radio-frequency identification (RFID) antenna in the first slot may detect an RFID tag in the first container as the first container is placed in the first slot. Information identifying the RFID tag may be used to check the first container in the first slot. Similarly, the information about this detection may be used to cause the first indicator to present a second indication (e.g., a green light). This second indication may be indicative of a successful placement of the first container. At this point, the first container and/or the first slot may be associated with the first customer order. If the first container were placed at a location other than where expected at the first slot, the first indicator may be caused to present a third indication (e.g., a red light). This third indication may be indicative of an error state. A similar method may be performed as part of a process for removing containers from the container holding fixture.

In another example, and building on the example above, a method identifying containers of a container holding fixture is provided. The container holding fixture may include a plurality of slots, with each slot holding a container. This method may be implemented as part of an item pick process. A user device associated with a human user may receive an instruction identifying a location of an item in a material handling facility. The human user may push a moveable cart including the container holding fixture to the location. At the location, the human user may locate the item and scan a barcode on the item using the user device. Based on this information, it may be determined which slot and/or container have been previously associated with the customer order. This reveals which container the item should be placed (e.g., in the container associated with the customer order to which the item belongs). Once the appropriate container and/or slot have been identified, an indicator disposed at the slot may be caused to present a first indication (e.g., a blue light). This first indication may alert the user that the item just scanned should be placed in the container held by the identified slot. It may then be determined that the item has been placed in the container. This determination may be based on the user performing a physical action (e.g., utilizing the user device to scan a barcode associated with the slot, pushing a button associated with the slot, etc.) and/or sensor information obtained by one or more sensors associated with the slot (e.g., an RFID sensor may detect the presence of an RFID attached to the item). If placement of the item in the container were not detected for some period of time, if an unexpected item were detected in the container, or if the item were detected in a different container, the indicator may be caused to present a second indication (e.g., a red light). This second indication may be indicative of an error state with regards to the placement of the item.

Once it has been determined that the item has been placed in the compartment, the indicator may be caused to present a third indication (e.g., a green light). This third indication may be indicative of a successful placement (e.g., the expected item was placed in the expected container). Information about placement of the item may be provided to an inventory management system. A similar method may be performed as part of a process for removing items from the container holding fixture.

The apparatuses and techniques described herein provide for improved detection of containers and items by using integrated sensors and a structural design that properly positions containers. The apparatuses and techniques described herein also reduce task time and the possibility of errors by reducing the cognitive difficulty a human user faces when making decisions about placing items and/or containers. This is a result of providing instructions to the user using relatively large visible indications which are presented directly where the tasks are to be performed (e.g., at the container holding fixture) instead of or in addition providing textual instructions on a relatively small screen of a handheld device. In this manner, the human user may avoid and/or limit having to interact with the screen of the handheld device. This allows the human user to focus more attention on the container holding fixture for task instructions and completion.

Improvements resulting from the apparatuses and techniques described herein may also be realized at the material handling facility and the computing devices used at the material handling facility. For example, the material handling facility may experience increased throughput as a result of fewer misplaced items, less troubleshooting time, less human time for tracking down misplaced items, and less time required for associating containers with moveable inventory carts. This increase in throughput may be achieved by using the apparatuses and techniques described herein (e.g., automation of identifying slots where containers should be placed and automation of identifying containers where items should be placed). Additionally, the risks associated with misplacements of items may be significantly reduced because of the manner in which the containers are identified (e.g., using different colored, relatively large, visible indicators); not to mention, actual misplacements may be decreased, for the same reasons.

Turning now to the figures, FIG. 1 illustrates a side perspective view of an example container holding fixture 100 for use in generating and providing location-based indications, according to at least one example. The container holding fixture 100 includes a frame 102 resting on a device support structure 104. The frame 102 and the device support structure 104 may be assembled separately and joined together. In some examples, the frame 102 and the device support structure 104 are formed from as a single structure. The frame 102 includes a set of rails 106(1), 106(2). The set of rails 106 may be spaced apart from each other and extend in substantially the same direction. The set of rails 106 may have an elongate shape. The set of rails 106 are separated by a set of dividers 108(1)-108(N), a few of which are labeled (e.g., 108(1) and 108(2)). The set of dividers 108 may be spaced apart and may extend between the set of rails 106. The set of dividers 108 may have an elongate shape. In some examples, the set of dividers 108 extend in substantially the same direction, which may be about orthogonal to the set of rails 106.

The set of rails 106 and the set of dividers 108 together define a set of slots 110(1)-110(N). In the example illustrated, the set of rails 106 and the set of dividers 108 together form four slots (e.g., 110(1)-110(4)). Any suitable number of slots 110 however may be provided, depending on the implementation. The slots 110 may be sized to accommodate a container such as a bin, bag, box, or the like. In some examples, each slot 110 has the same dimensions. In other examples, the slots 110 may have different dimensions to accommodate containers having varied dimensions. For example, the set of rails 106 and the set of dividers 108 may together define a set of slots have a non-rectangular shape (e.g., round, oval, square, polygonal, etc.). In some examples, the frame 102 may be formed from one or more circular rails 106 that on their own form circular-shaped slots 110.

In some examples, spaced apart with reference to the set of rails 106 and the set of dividers 108 can depend on the application and design parameters. For example, the set of rails 106 may be spaced apart at a width that corresponds to a width of a moveable inventory cart. The set of dividers 108 may be spaced apart to achieve a desired number of the slots 110 to hold a desired number of containers. In some examples, the moveable inventory cart may have predefined dimensions and the dimensions of the container holding fixture 100 (e.g., the amount the rails 106 are spaced apart, the length of the rails 106, the amount the dividers 108 are spaced apart, and the length of the dividers 108) may correspond to the predefined dimensions. In some examples, based on the number of desired slots 110 and the predefined dimensions, the configuration of the rails 106 and the dividers 108 may be selected. In an example, a 5'×2' inventory cart may be configured to hold three containers cart is to hold four containers. In this example, the rails 106 may be spaced apart at slightly less than 2' centers. The length of the rails 106 may be slightly less than 5'. The dividers 108 may extend between the rails 106 and be spaced apart at about 15". In this manner, five dividers 108 may be used to create four slots, with each slot measuring about 24" (minus the widths of the rails 106)×15".

The slot 110(1) includes one or more sensor packages 112(1). The other slots 110 may include other sensor packages 112(2)-112(N) similar to the sensor package 112(1). The sensor packages 112 may include any suitable combination of sensors configured to implement the techniques described herein. For example, an example sensor package 112 may include a radio-frequency identification (RFID) antenna, a pressure sensor, a weight sensor, and/or an optical sensor. The sensor packages 112 may be used to detect conditions (e.g., movements, presence, and/or absence) of containers with respect to the sensor packages 112, detect conditions (e.g., movements, presence, and/or absence) of items with respect to the sensor package 112, and/or detect conditions (e.g., movements, presence, and/or absence) of other objects (e.g., a hand of a user, a robotic arm, etc.). The sensor packages 112 may be embedded in an upper surface 114 of the device support structure 104. For example, RFID antennas may be mounted directly below the upper surface 114 of the device support structure to detect when a container including an RFID tag is placed in the slot 110. In some examples, the sensor packages 112 may be attached to the frame 102 or otherwise attached to the device support structure 104 at other locations. In other examples, the RFID antenna may detect when items are placed in the container held by the slot 110. In some examples, other sensors such as weight or pressure sensors may be used to detect when items are placed in the container held by the slot 110.

The set of rails 106 include a set of light windows 116(1)-116(N), a few of which are illustrated (e.g., 116(1) and 116(2)) with respect to the slot 110(1). In some examples, each slot 110 includes at least one light window 116. The light windows 116 may function as interfaces to provide information to a human user. The information may be useful for interacting with the container holding fixture 100. The information may be provided in the form of one or more visual indications or indications of other types (e.g., audible). For example, lighting devices may be included behind the light windows 116 (e.g., recessed within the rails 106). Examples of lighting devices include, but are not limited to, a light strip including light-emitting diodes (LEDs), light bulbs, lasers, and other similar lighting devices. In some examples, each rail 106 may include an LED light strip that extends essentially from end to end of the rails 106. The LED light strips may be configured to present visual indications of various colors selectively within each of the light windows 116. For example, a first set of visual indications may be presented in the light windows 116(1), 116(2) (e.g., green lights), while a second set of visual indications are presented in the light windows 116(3), 116(4) (e.g., red lights). The visual indications presented in the light windows 116 can be selected to inform the user where at task should be performed, and in some instances, what task should be performed. For example, visible indicators can be presented in the light windows 116(1), 116(2) to call the user's attention to the slot 110(1). Depending on the types of tasks performable at the container holding fixture 100, the possible color combinations of the visible indicators, and the possible flashing combinations of the visible indicators, the user may know what task should be performed at the slot 110(1).

The light windows 116 may be designed to allow light emissions through at least two light surfaces in at least two directions. For example, as illustrated with respect to the light window 116(2), light may be emitted upwards (e.g., as shown by the top arrows) via a first light surface 118(1) and laterally outwards (e.g., as shown by the lower arrows) via a second light surface 118(2). This may enable visibility of the light emissions under a wide variety of viewing conditions (e.g., in environments with bright lights, when containers are loaded into the slots 110, when the human user is located at different positions with respect to the container holding fixture 100, etc.). The light windows 116 may be formed from a material having transparent properties (e.g., plastic, glass, etc.). The light windows 116 may be configured to diffuse the light emissions to achieve a desired level of brightness and color contrast. For example, the light windows 116 may include different combinations of light-diffusing material arranged in a manner that achieves the desired level of brightness and color contrast.

The container holding fixture 100 also includes a fixture computing device 120 and a reader device 122. As described in detail herein, the fixture computing device 120 may be any suitable computing device capable of processing computer instructions. The fixture computing device 120 may be communicatively coupled to the sensor packages 112, the reader device 122, the lighting devices within the rails 106, and/or other external computing devices. In this manner, the fixture computing device 120 may receive sensor data from the sensor packages 112 (e.g., via the reader device 122), select which light windows should emit what type of light, instruct the lighting devices to emit the selected light, provide data about interactions with the slots 110 to an inventory management system, and perform any other suitable computation and/or communication. In some examples, the container holding fixture 100 may also include a microcontroller to control aspects of the light in the light windows. For example, the fixture computing device 120 may provide instructs to the microcontroller, which may selectively turn on and turn off power to lighting devices.

The reader device 122 may be any suitable device capable of connecting to one or more sensors from the sensor packages 112 to perform the techniques described herein. In some examples, the reader device 122 is an RFID reader device configured to detect RFID tags using RFID antennas (e.g., a type of sensor from the sensor packages 112). The reader device 122 may share information about the detected RFID tags with the fixture computing device 120. The fixture computing device 120 may then use such information for determining which lighting devices to turn on, to turn off, to flash, etc.

Figure 2:
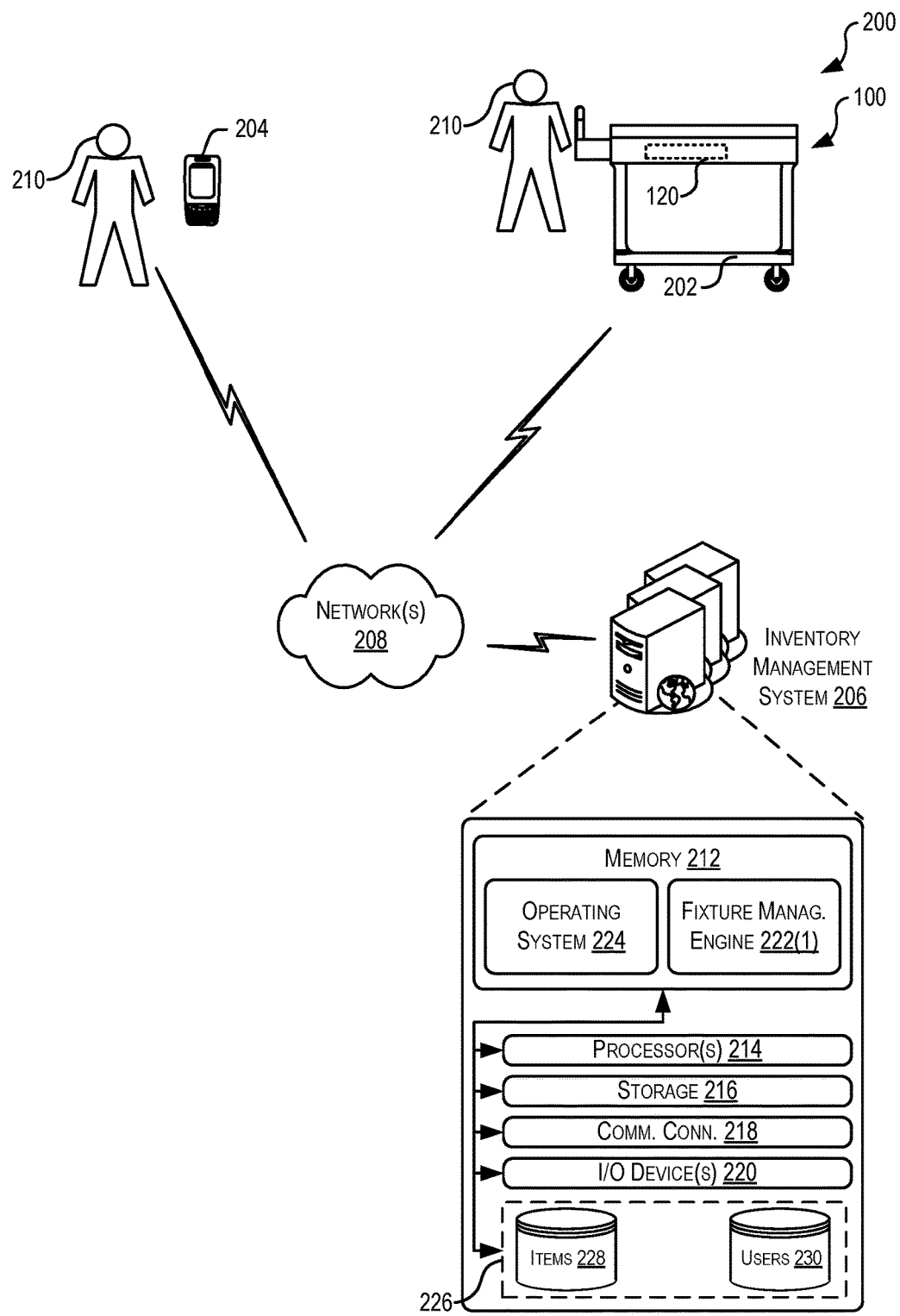
FIG. 2 illustrates an example architecture or system for use in generating and providing location-based indications, according to at least one example.

FIG. 2 illustrates an example architecture or system 200 for use in generating and providing location-based indications, according to at least one example. The architecture 200 includes the fixture computing device 120 held within the container holding fixture 100 installed on a moveable cart 202. The architecture 200 also includes a user device 204 and an inventory management system 206. The fixture computing device 120, the user device 204, and the inventory management system 206 may be in communication with each other via one or more networks 208 (e.g., via Bluetooth, Wi-Fi, the Internet, or the like). In the architecture 200, one or more users 210 may utilize the user device 204 to interact with aspects of the fixture computing device 120 and the inventory management system 206 via the network 208. The user 210 may also physically interact with the moveable cart 202 may pushing or otherwise causing the moveable cart 202 to move.

The network 208 may include any one or a combination of many different types of networks, such as cable networks, the Internet, wireless networks, cellular networks, satellite networks, other private and/or public networks, or any combination thereof. While the illustrated example represents the user device 204 and the fixture computing device 120 accessing the inventory management system 206 via the network 208, the described techniques may equally apply in instances where the user device 204 interacts with the fixture computing device 120 and/or the inventory management system 206 over a landline phone, via a kiosk, or in any other manner. It is also noted that the described techniques may apply in other client/server arrangements (e.g., set-top boxes, etc.), as well as in non-client/server arrangements (e.g., locally stored applications, peer to peer configurations, etc.).

As noted above, the user device 204 may be configured to manage aspects of generating and providing location-based indications. To this end, the user device 204 may be any type of computing device such as, but not limited to, a handheld inventory device, a mobile phone, a smartphone, a personal digital assistant (PDA), a laptop computer, a desktop computer, a thin-client device, a tablet computer, a wearable device, or the like. In some examples, in addition to or instead of the user device 204, the architecture 200 may include Flux gloves for interacting with the container holding fixture 100. Additional details of the user device 204 are described herein with reference to FIG. 8.

As noted above, the fixture computing device 120 may be configured to manage aspects of generating and providing location-based indications. To this end, the fixture computing device 120 may be any type of computing device such as, but not limited to, a mobile phone, a smartphone, a personal digital assistant (PDA), a laptop computer, a desktop computer, a thin-client device, a tablet computer, a wearable device, or the like. Additional details of examples of fixture computing device 120 are described herein with reference to FIG. 9.

The inventory management system 206 may be configured to manage aspects of generating and providing location-based indications. To this end, the inventory management system 206 may include any suitable combination of one or more computing devices such as, but not limited to, a server, a virtual machine instance, a set of servers or set of virtual machines, a mobile phone, a smartphone, a PDA, a laptop computer, a desktop computer, a thin-client device, a tablet computer, etc. The inventory management system 206 may function to manage the operation of many user devices 204 and many fixture computing devices 120. For example, the inventory management system 206 may have access to a plurality of material handling facilities, each holding inventory on behalf of a retailer. The inventory management system 206 may be designed to process customer requests and/or orders for inventory stored by the inventory management system 206. Based on these requests and/or orders, the inventory management system 206 may compile a set of set of tasks to be performed in order to respond to the request and/or fulfill the customer order. In some examples, some tasks may be executed automatically by computer-controlled systems, while others are performed manually by human users. For example, certain tasks may be provided to the user 210 via the user device 204. Based on input received at the user device 204, the user device 204 may cause the fixture computing device 120 to perform one or more actions (e.g., cause presentation of indicators). The fixture computing device 120 may then report back to the inventory management system 206 actions that took place at the container holding fixture 100.

In one illustrative configuration, the inventory management system 206 may include at least one memory 212 and one or more processing units (or processor(s)) 214. The processor(s) 212 may be implemented as appropriate in hardware, computer-executable instructions, firmware, or combinations thereof. Computer-executable instruction or firmware implementations of the processor(s) 214 may include computer-executable or machine-executable instructions written in any suitable programming language to perform the various functions described.

The memory 212 may store program instructions that are loadable and executable on the processor(s) 214, as well as data generated during the execution of these programs. Depending on the configuration and type of the inventory management system 206, the memory 212 may be volatile (such as RAM) and/or non-volatile (such as ROM, flash memory, etc.). The inventory management system 206 may also include additional removable storage and/or non-removable storage 216 including, but not limited to, magnetic storage, optical disks, and/or tape storage. The disk drives and their associated non-transitory computer-readable media may provide non-volatile storage of computer-readable instructions, data structures, program modules, and other data for the computing devices. In some implementations, the memory 212 may include multiple different types of memory, such as SRAM, DRAM, or ROM. While the volatile memory described herein may be referred to as RAM, any volatile memory that would not maintain data stored therein once unplugged from a host and/or power would be appropriate. The memory 212 and the additional storage 216, both removable and non-removable, are both additional examples of non-transitory computer-readable storage media.

The inventory management system 206 may also contain communications connection(s) 218 that allow the inventory management system 206 to communicate with a data store, another computing device or server, user terminals and/or other devices via the networks 208. In this manner, the communications connections 218 can include network interfaces to enable connection to network devices. The inventory management system 206 may also include I/O device(s) 220, such as a keyboard, a mouse, a pen, a voice input device, a touch input device, a display, speakers, a printer, etc.

Turning to the contents of the memory 212 in more detail, the memory 212 may include an operating system 224 and/or one or more application programs or services for implementing the features disclosed herein including a fixture management engine 222(1). In some examples, the fixture management engine 222(1) may be configured to manage aspects generating and providing location-based indications.

The inventory management system 206 may also include a data store 226. In some examples, the data store 226 may include one or more data stores, databases, data structures, or the like for storing and/or retaining information associated with the inventory management system 226. For example, the data store 226 may include databases, such as an item database 228 and a user database 230.

The item database 228 may be used to store information about items as described herein. For example, the item database 228 may include information about storage locations of the items within a material handling facility. The item database 228 may also include information about characteristics of the items which may be used for purposes of planning the collection of the items using the moveable carts 202. For example, the information may identify dimensions, weight, and the like.

The user database 230 may be used to store information about the users 210 that operate the user device 204 and interact with the container holding fixture 100. For example, the user database 230 may include data that describes user interactions of the user 210 with respect to the container holding fixture 100. For example, the data may indicate error states detected while the user used the container holding fixture 100, success states detected, time for placement of containers, time for retrieval of items and placement into containers, and any other suitable metric that can be used to rank or otherwise evaluate the performance of the users 210.

Figure 3:
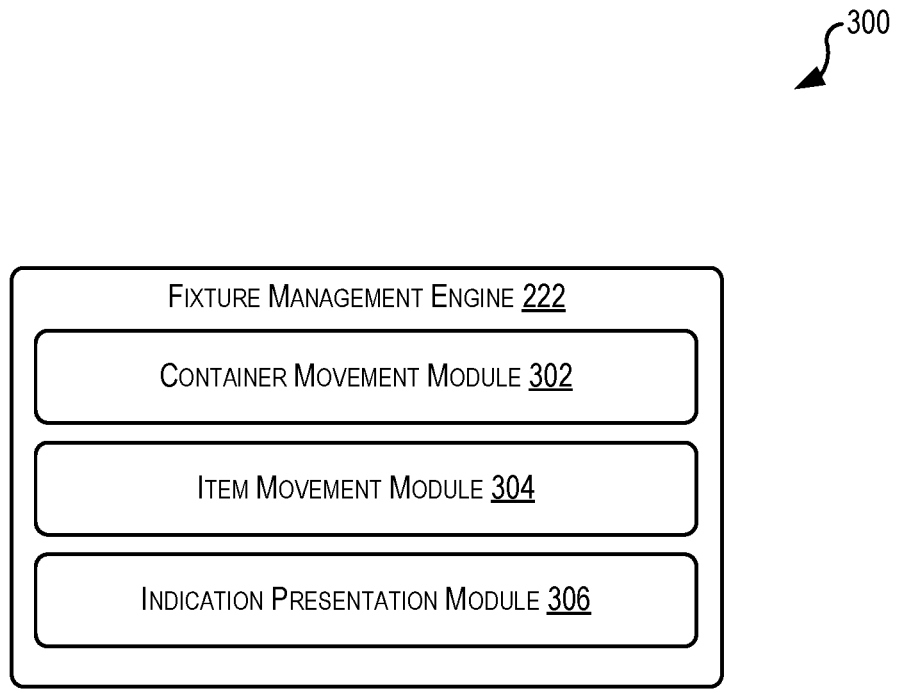
FIG. 3 illustrates an example device for use in generating and providing location-based indications, according to at least one example.

FIG. 3 illustrates an example device 300 including the fixture management engine 222. As described herein, different variations of the fixture management engine 222 may be included in the inventory management system 206, the user device 204, and/or the fixture computing device 120. In this manner, the function described with reference to the example device 300 and the accompanying flow charts may be implemented by at least one of the inventory management system 206, the user device 204, or the fixture computing device 120. In some examples, the functions may be spread among the inventory management system 206, the user device 204, and the fixture computing device 120. In any event, the fixture management engine 222 may be configured to manage one or more sub-modules, components, and/or services directed to examples disclosed herein. In some examples, the fixture management engine 222 may include a container movement module 302, an item movement module 304, and an indication presentation module 306. While these modules are illustrated in FIG. 3 and will be described as performing discrete tasks with reference to the flow charts, it is understood that FIG. 3 illustrates example configurations and other configurations performing other tasks and/or similar tasks as those described herein may be implemented according to the techniques described herein.

The container movement module 302 may be configured to manage one or more sensors and/or sensor reading devices to detect movements of containers with respect to slots of the fixtures described herein. Such detected movements can include detecting placement of containers within slots, detecting removal of containers from slots, and the like. In some examples, the container movement module 302 may receive sensor data from a sensor disposed in a slot and use the sensor data to determine the state of a container.

The item movement module 304 may be configured to manage one or more sensors and/or sensor reading devices to detect movements of items with respect to containers held within slots of the fixtures described herein. Such detected movements can include detecting placement of items within containers, detecting removal of items from containers, and the like. In some examples, the item movement module 304 may receive sensor data from a sensor disposed in a slot and use the sensor data to determine the state of an item. For example, a weight or pressure sensor disposed in the slot may be used to determine that an item has been placed in the container. In some examples, the item movement module 304 may receive signals from other devices that may be used to detect movements. For example, scan data may be received from an optical scanner of a handheld device that identifies a slot where an item was placed. As an additional example, a manual button may be depressed by the human user as part of the process of placing an item in a container.

A signal generated by the manual button may be used to determine that the item has been placed in the container.

The indication presentation module 306 may be configured to determine when, where, and what indications should be presented. For example, the indication presentation module 306 may determine that a first slot should be highlighted with a first indication prior to receiving a container. Once the container has been successfully placed (e.g., based on feedback processed by the container movement module 302), the indication presentation module 306 may cause the first slot to be highlighted with a second indication. The indication presentation module 306 may also determine a next slot to highlight after the first slot has been highlighted. As an additional example, the indication presentation module 306 may determine which slot should be highlighted as part of placing and/or retrieving items.

Figure 4:
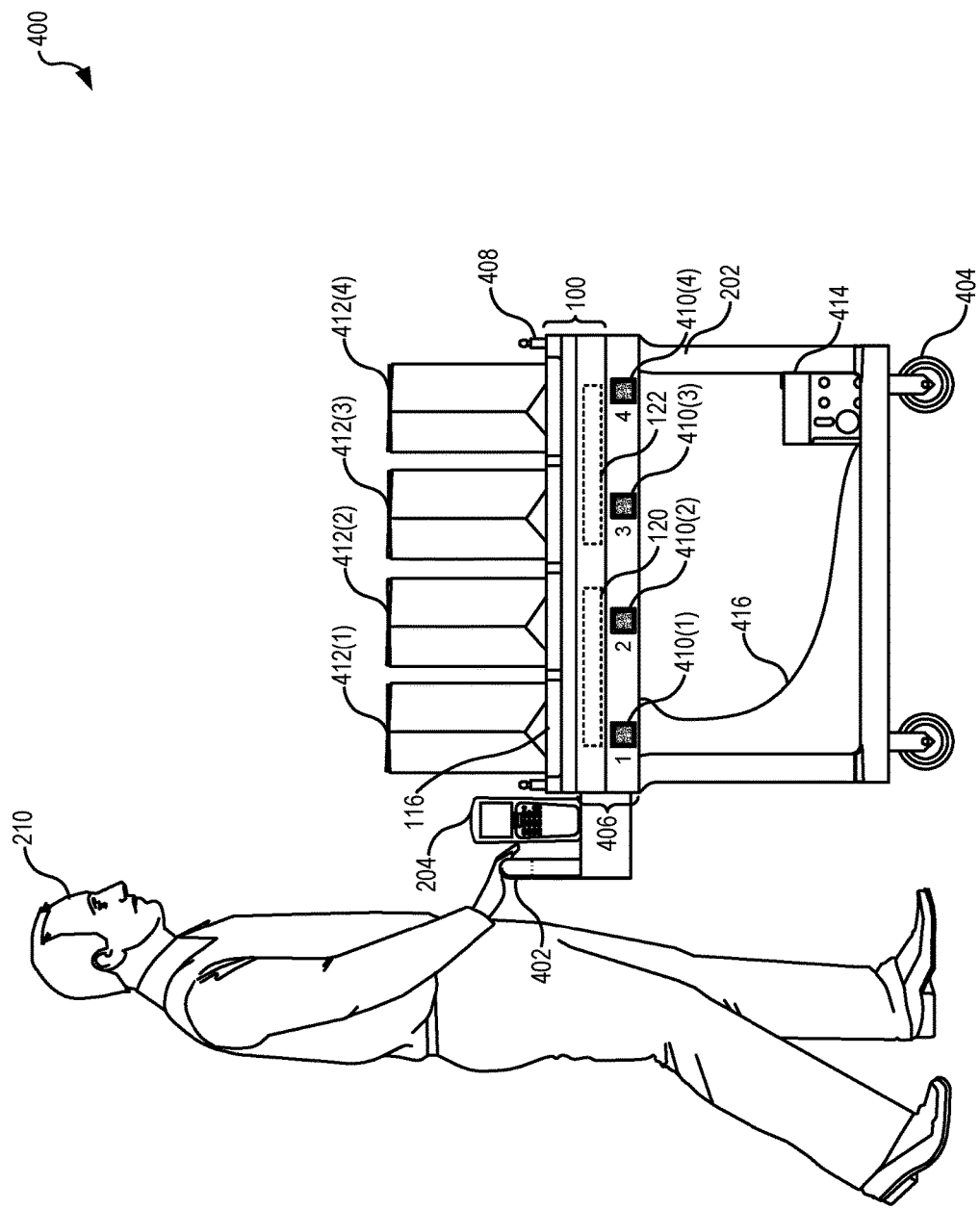
FIG. 4 illustrates an example system including a moveable cart including the container holding fixture of FIG. 1 for use in generating and providing location-based indications, according to at least one example.

FIG. 4 illustrates an example system 400 including the moveable cart 202 and the container holding fixture 100 for use in generating and providing location-based indications, according to at least one example. The moveable cart 202 can be any suitable device capable of supporting the container holding fixture 100 and capable of being moved. For example, the moveable cart 202 can include, among other things, a handle 402, a set of wheels 404, and a fixture receiving area 406. In some examples, the container holding fixture 100 is received within the fixture receiving area 406 and held within the fixture receiving area 406. For example, the fixture receiving area 406 may be a bin disposed on a top portion of the moveable cart 202, and the container holding fixture 100 may be sized to sit down inside the bin. In some examples, at least a portion of the container holding fixture 100 extends above the sides of the bin. In other examples, the sides of the bin extend above the container holding fixture 100. The container holding fixture 100 may also be secured to the moveable cart 202 using one or more securing structures 408. The securing structures 408 may also be used to hold different layers and parts of the container holding fixture 100 together (e.g., the frame 102 and the device support structure 104) and/or to secure the container holding fixture 100 to the moveable cart 202. The securing structures 408 may include one or more bolts, rods, or other similar structures.

In some examples, a process for loading the container holding fixture 100 to the moveable cart 202 may include placing the container holding fixture 100 on the moveable cart 202 such that a lower surface of the container holding fixture 100 rests on the moveable cart 202. The process can also include connecting a power source 414 of the moveable cart 202 to at least one of the fixture computing device 120, the reader device 122, or any of the sensors in the sensor packages 112. The process may further include securing the container holding fixture 100 to the moveable cart 202 using at least one of the securing structures 408.

The moveable cart 202 may also include identifiers 410(1)-410(N), a few of which are illustrated (e.g., 410(1)-410(4)). The identifiers 410 may function to identify individual slots of the container holding fixture 100. For example, the identifier 410(1) may identify a first slot, the identifier 410(2) may identify a second slot, and so forth. The identifiers 410 may include a human-readable portion (e.g., "1") and a machine-readable portion (e.g., a barcode). The identifiers 410 may include suitable continuous or discrete one-dimensional or linear barcode (e.g., universal product code (UPC), stock keeping unit (SKU), Codabar, Code 25, Code 39, Code 128, EAN 2, EAN 5, Facing Identification Mark, Intelligent Mail Barcode, MSI, Pharmacode, PLANET, Plessey, and any other suitable one-dimensional barcode) or two-dimensional or matrix barcode (e.g., QR code, color-based code, Aztec code, and other suitable two-dimensional barcodes). In some examples, the user 210 may use the user device 204 to scan or otherwise read the machine-readable portions of the identifiers 410 as part of implementing techniques described herein. For example, the user 210 may receive an instruction to place an item in one of the containers 412 (e.g., the container 412(1)). In this example, the containers 412 may have been previously placed on the moveable cart 202 and associated with customer orders. The instruction may be received at the user device 204. The instruction may also be relayed (or a similar instruction may be sent directly) to the fixture computing device 120. The fixture computing device 120 may then cause the light windows 116 associated with the slot where the container 412(1) is located to emit light. These light emissions may assist the user 210 to quickly and easily identify the appropriate container for placement of the item. After placing the item, the user 210 can use the user device 204 to scan the identifier 410(1) to indicate that the item has been placed in the container 412(1). In this manner, the machine-readable portions of the identifiers 410 can be used to determine item location.

In some examples, the containers 412 may each include an RFID tag. The RFID tags may be printed on the containers 412, attached to the containers 412 using an adhesive, and included in any other suitable manner. In some examples, the RFID tags may be used to uniquely identify each of the containers 412. The RFID tag may be included as part of an identifying label that includes human and machine readable elements that is attached to the containers 412.

The system 400 may also include the power source 414 in electrical communication with the container holding fixture 100. In particular, the container holding fixture 100 may include a power cord 416 that can be plugged into the power source 414. Via the power cord 416, the power source 414 may provide power to the fixture computing device 120, the reader device 122, and any other electrical device described with reference to the container holding fixture 100.

Figure 5:
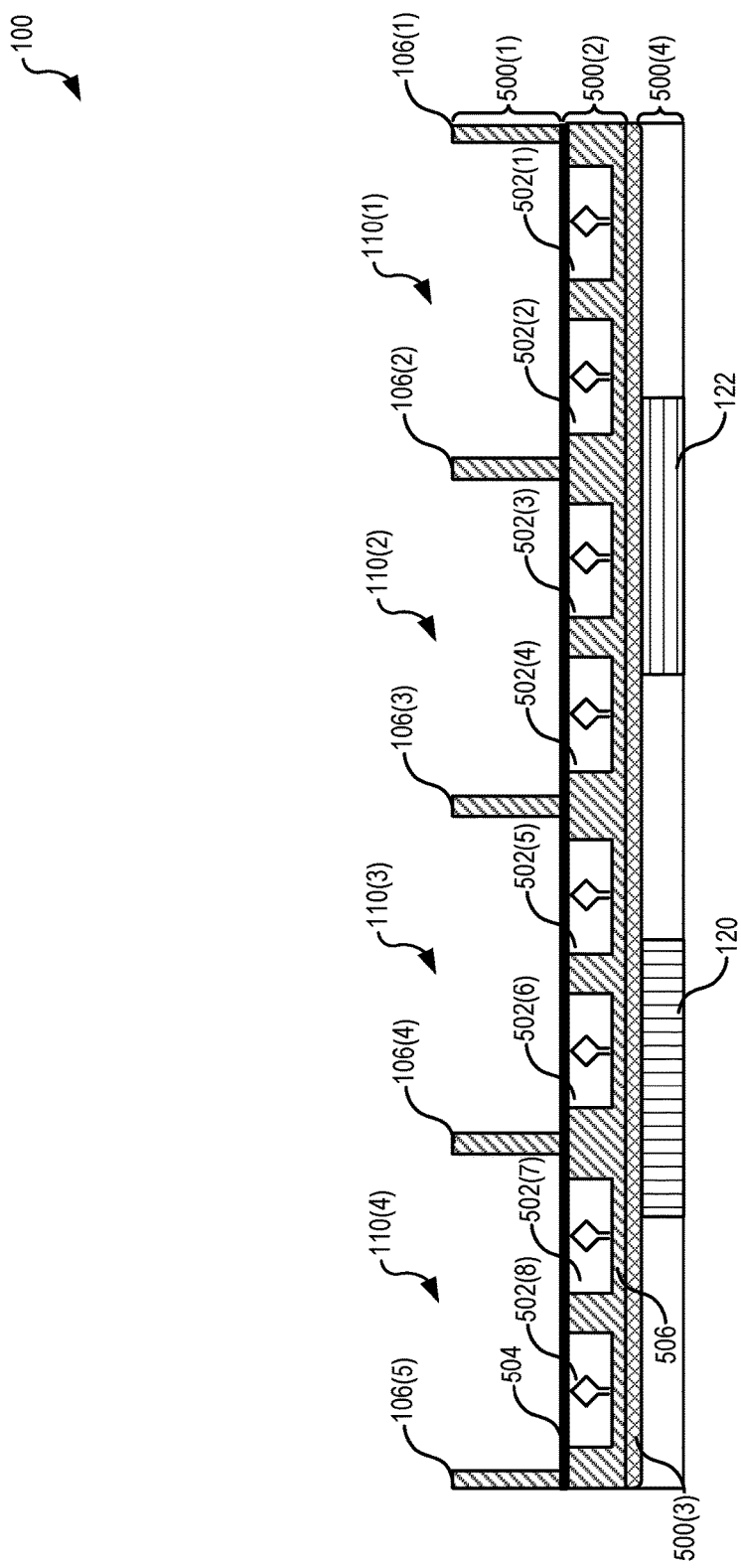
FIG. 5 illustrates a profile view of the container holding fixture of FIG. 1 for use in generating and providing location-based indications, according to at least one example.

FIG. 5 illustrates a profile view of the container holding fixture 100 for use in generating and providing location-based indications, according to at least one example. The container holding fixture 100 may include multiple layers 500(1)-500(4). Within a first layer 500(1) may be disposed the portion of the container holding fixture 100 that includes the frame 102. As illustrated in FIG. 5, the first layer 500(1) may include the dividers 108 and the slots 110. While not illustrated in FIG. 5, the first layer 500(1) may also include the rails 106.

Within a second layer 500(2) may be disposed sensors such as antennas 502 (e.g., RFID antennas). The antennas 502 are examples of sensors that may be included in the sensor packages 112. In the illustrated example, the first layer 500(1) and the second layer 500(2) are separated by surface 504. In some examples, the containers may rest on the surface 504 when they are placed in the slots 110. The thickness of the surface 504 and the attachment locations of the RFID antennas 502 may be selected to achieve proper sensing of identifying tags (e.g., RFID tags or other comparable tags) located in the containers (e.g., in the bottom surface of the containers). In some examples, the antennas 502 may be antennas designed for sensing identifying tags located in close proximity. For example, the antennas 502 may include the following specifications: an operating frequency of 902-928 Mhz, circular polarization, gain of 5.5 dBi, elevation beamwidth of 100 degrees, and azimuth beamwidth of 100 degrees. An example RFID antenna may include the Laird S9025PR (RHCP) RFID antenna. Other antennas 502 having different specifications may be used in other implementations. The antennas 502 may be communicatively coupled to the reader device 122 and/or the fixture computing device 120. In some examples, the container holding fixture 100 may be configured such that items and/or containers may be detected at heights above the surface 504. For example, the dividers 106 may have greater heights and be formed from RF absorbing material. Additionally, the antennas 502 may be configured to read identifying tags at locations elevated well above the surface 504 within the respective slots 110. The taller dividers 106 formed from RF absorbing material may minimize the occurrence of cross-reads (e.g., identifying tags in the slot 110(3) using the antennas 502(8) or 502(7) associated with the slot 110(4)).

In the illustrated example, each of the slots 110 may include more than one antenna 502. For example, the slot 110(1) includes two antennas 502(1), 502(2). The number of antennas 502 may be selected to ensure adequate sensing coverage of the area within the slot 110. In some examples, the antennas 502 may be connected to the reader device 122 via any suitable combination of signal splitters and a sensor hub (e.g., an RFID antenna hub). The antennas 502 may be disposed in a radio-frequency (RF) absorbing material 506 (e.g., an RF absorbing foam). The RF absorbing material 506 may extend around the bottom sides of the antennas 502. In this manner, the RF absorbing material 506 may function as a Faraday cage to direct RF energy towards the slots 110 and/or to keep RF energy from being directed towards a third layer 500(3) or a fourth layer 500(4). In some examples, compartments are formed in the RF absorbing material 506, and the antennas 502 are installed in the compartments.

The third layer 500(3) may include a gasket. The gasket in the third layer 500(3) may function to separate the second layer 500(2) including the antennas 502 from the fourth layer 500(4) including the fixture computing device 120 and the reader device 122.

The fourth layer 500(4) may include the fixture computing device 120 and the reader device 122. In some examples, the fixture computing device 120 and the reader device 122 are included in the second layer 500(2). The fixture computing device 120 and the reader device 122 may be held within one or more compartments formed in the device support structure 104.

The container holding fixture 100 may be formed from any suitable material such as, but not limited to, thermoplastic polymers (e.g., acrylonitrile butadiene styrene, nylon, acrylic, polycarbonate, and other thermoplastics), composite materials (e.g., polymer-matrix composite, fiber reinforced plastics, carbon fiber reinforced polymer, and other composite materials), wood, and certain other RF-energy attenuating materials.

Figure 6:
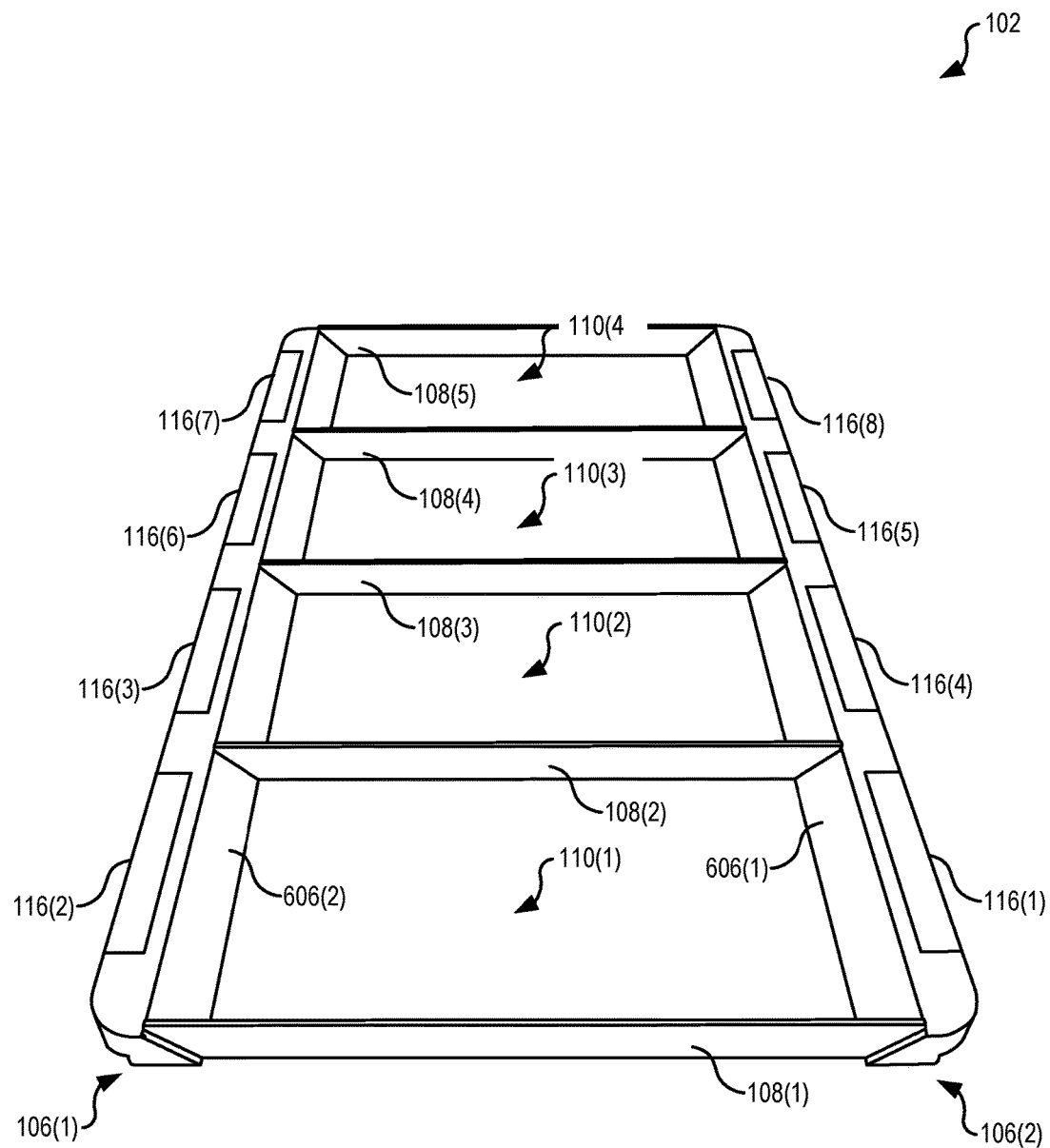
FIG. 6 illustrates a top perspective view of a frame of a container holding fixture for use in generating and providing location-based indications, according to at least one example.
Figure 7:
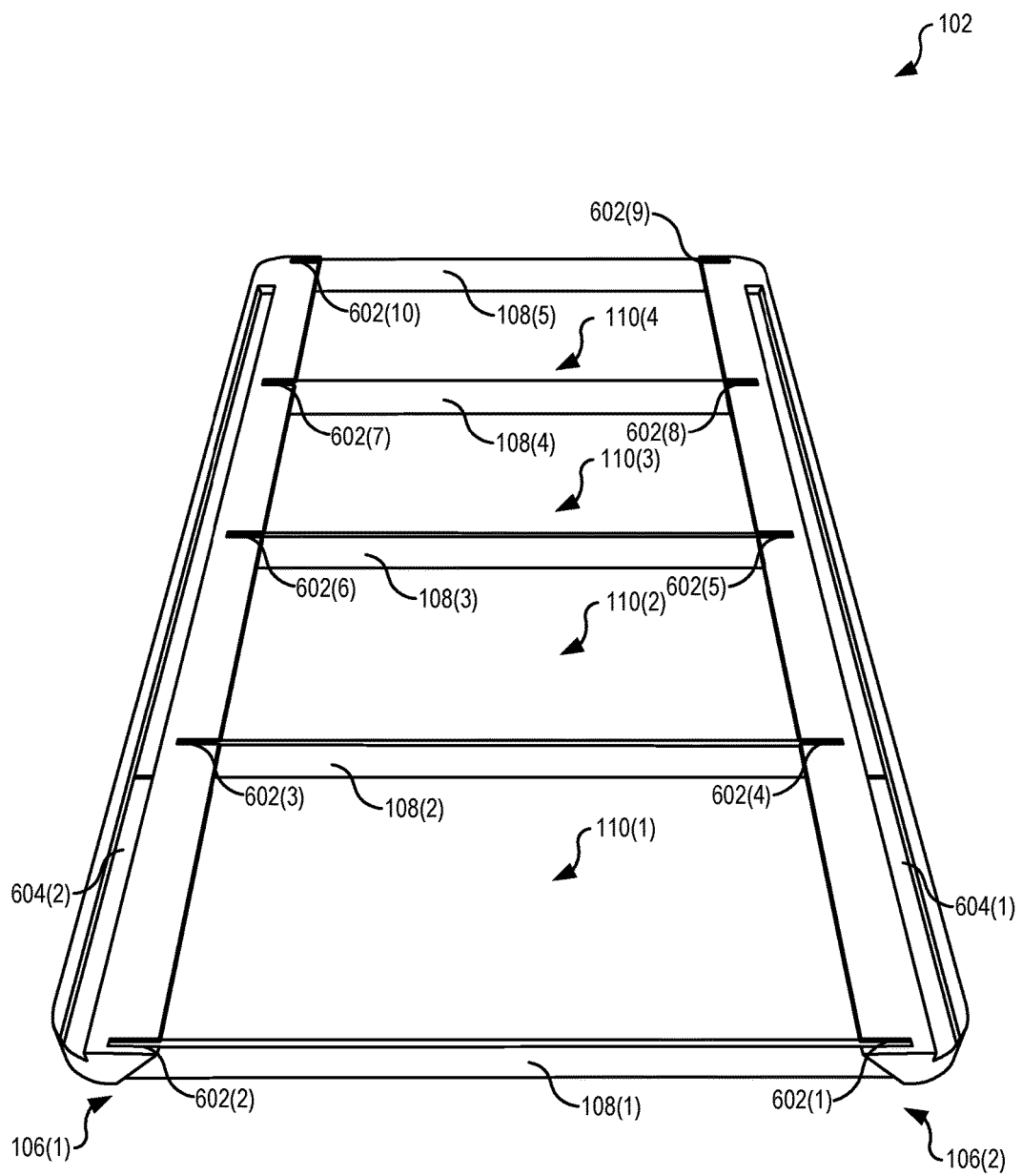
FIG. 7 illustrates a bottom perspective view of the frame of FIG. 6 for use in generating and providing location-based indications, according to at least one example.

FIG. 6 and FIG. 7 respectively illustrate a top perspective view and a bottom perspective view of the frame 102 of the container holding fixture 100 for use in generating and providing location-based indications, according to at least one example. As introduced herein, the frame 102 includes the set of rails 106 and the set of dividers 108. In the illustrated example, the frame 102 includes five dividers 108(1)-108(5), which together form four slots 110(1)-110(4). In some examples, the number of slots 110 may correspond to the number of light windows 116 disposed along each of the rails 106. In this manner, each slot 110 may include at least one light window 116 and, in some examples, may include two or more light windows 116.

The rails 106 may be formed to include inward sloping faces 606(1), 606(2). The inward sloping faces may be desirable to ensure proper alignment of containers within the slots 110. For example, if a container were placed on the edge of the inward sloping face 606(1), because of the slop of the face 606(1), the container would likely slide down within the slot 110. This may ensure a better reading of the container and/or items held within the container.

Similarly as described with reference to the container holding fixture 100 itself, the dividers 108 and the rails 106 may be formed from any suitable material such as, but not limited to, thermoplastic polymers (e.g., acrylonitrile butadiene styrene, nylon, acrylic, polycarbonate, and other thermoplastics), composite materials (e.g., polymer-matrix composite, fiber reinforced plastics, carbon fiber reinforced polymer, and other composite materials), wood, and certain other RF-energy attenuating materials.

In some examples, the dividers 108 may encase, be wrapped, or otherwise coated in an RF-absorbing material to limit antennas readings to individual slots 110 (e.g., to minimize detecting identifying tags in the slot 110(1) using an antenna disposed in the slot 110(2)). In some examples, the placement of the antennas as discussed with reference to FIG. 5 may be selected in a manner that is similarly considerate to avoid cross readings. The dividers 108 may be releasable attached to the rails 106 by inserting the dividers 108 into one or more divider grooves 602(1)-602(10). In some examples, the dividers 108 are held in the divider grooves 602 via a snap-fit, an interference fit, a screw or other fastener, and the like.

The rails 106 may also include light grooves 604 disposed on the bottom side of the frame 102. The light grooves 604 may be configured to receive a light strip or other device capable of producing indications. In some examples, the light strip may be an LED light strip that is capable of producing more than one color selectively in certain locations. In some examples, the LED light strip may include any suitable combination of LED lighting elements. The light grooves 604 may include openings that extend into the areas of the light windows 116. These openings may function as pathways for light to travel from the light grooves 604 through the light windows 116. When the frame 102 is installed on the device support structure 104, the light strip or other lighting elements may be trapped within the light grooves, with an upper surface of the device support structure 104 below the light grooves 604.

Figure 8:
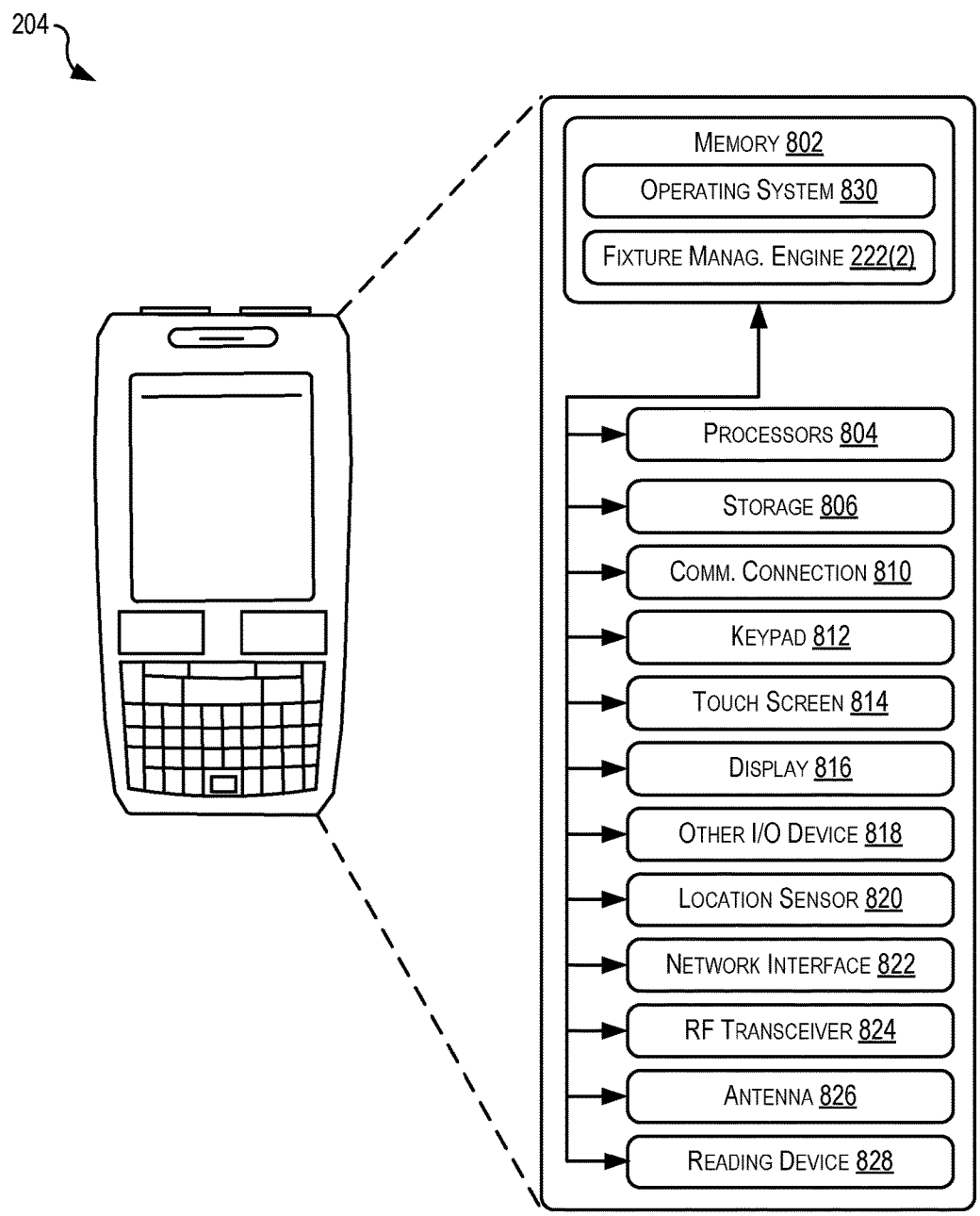
FIG. 8 illustrates a schematic representation of an example user device for use in generating and providing location-based indications, according to at least one example.

FIG. 8 illustrates a schematic representation of the user device 204 for use in generating and providing location-based indications, according to at least one example. The user device 204 can include at least one memory 802 and one or more processing units (or processor(s)) 804. The processor(s) 804 may be implemented as appropriate in hardware, computer-executable instructions, firmware, or combinations thereof. Computer-executable instruction or firmware implementations of the processor(s) 804 may include computer-executable or machine-executable instructions written in any suitable programming language to perform the various functions described.

The memory 802 may store program instructions that are loadable and executable on the processor(s) 804, as well as data generated during the execution of these programs. Depending on the configuration and type of the user device 204, the memory 802 may be volatile (such as random access memory (RAM)) and/or non-volatile (such as read-only memory (ROM), flash memory, etc.). The user device 204 may also include additional removable storage and/or non-removable storage 806 including, but not limited to, magnetic storage, optical disks, and/or tape storage. The disk drives and their associated non-transitory computer-readable media may provide non-volatile storage of computer-readable instructions, data structures, program modules, and other data for the computing devices. In some implementations, the memory 802 may include multiple different types of memory, such as static random access memory (SRAM), dynamic random access memory (DRAM), or ROM. While the volatile memory described herein may be referred to as RAM, any volatile memory that would not maintain data stored therein once unplugged from a host and/or power would be appropriate.

The memory 802 and the additional storage 806, both removable and non-removable, are all examples of non-transitory computer-readable storage media. For example, non-transitory computer readable storage media may include volatile or non-volatile, removable or non-removable media implemented in any method or technology for storage of information such as computer-readable instructions, data structures, program modules, or other data. The memory 802 and the additional storage 806 are both examples of non-transitory computer storage media. Additional types of computer storage media that may be present in the user device 204 may include, but are not limited to, phase-change RAM (PRAM), SRAM, DRAM, RAM, ROM, electrically erasable programmable read-only memory (EEPROM), flash memory or other memory technology, compact disc read-only memory (CD-ROM), digital video disc (DVD) or other optical storage, magnetic cassettes, magnetic tape, magnetic disk storage or other magnetic storage devices, or any other medium that can be used to store the desired information and that can be accessed by the user device 204. Combinations of any of the above should also be included within the scope of non-transitory computer-readable storage media. Alternatively, computer-readable communication media may include computer-readable instructions, program modules, or other data transmitted within a data signal, such as a carrier wave, or other transmission. However, as used herein, computer-readable storage media does not include computer-readable communication media.

The user device 204 may also include communications connection(s) 810 that allow the user device 204 to communicate with a data store, another computing device or server, user terminals, and/or other devices via the networks 208. The user device 204 may also include I/O device(s), such as a keypad 812, a touch screen 814, a display 816, and other I/O devices 818 (e.g., a mouse, a pen, a voice input device, speakers, a printer, etc.). For example, on the display 816 may be presented retrieval instructions for obtaining an item from an inventory storage location. Other instructions may also be presented on the display 816. The user may use the other I/O devices 818, the keypad, and/or the touch screen 814 to interact with the systems described herein. For example, the user may mark an item as placed in a compartment using a hard key on the keypad 812.

The user device 204 may also include a location sensor 820, a network interface 822, a radio-frequency (RF) transceiver 824, and an antenna 826. The location sensor 820 can include any suitable sensor that informs the user device 204 of its geolocation including, but not limited to, Global Positioning System (GPS) based on satellites circling the Earth. The location sensor 820 may additionally or alternatively determine geolocation by radio signal triangulation (e.g., triangulation based on radio antenna signal strength), or receiving a notification from a fixed location (e.g., a beacon signal broadcasting a location).

The network interface 822 may be configured for wirelessly communicating with the network 208. The network interface 822 may use any standard protocols for network communication. In some examples, the network interface 822 may use the antenna 826 to send and receive data over the networks 208. In some examples, the network interface 822 may provide information to the location sensor 820 (e.g., a closest network access point) from which the location sensor 820 can infer or calculate a location of the user device 204.

The RF transceiver 824 may be configured to transmit and receive RF signals. For example, the RF transceiver 824 can function communicate with passive and/or active RFID tags or other devices capable of receiving and/or providing information via RF signals.

The user device 204 may also include a reading device 828. The reading device 828 may be configured to read a variety of different human-readable and machine-readable elements. For example, the reading device 828 can include an optical scanner configured to read barcodes. The reading device 828 can also include an RFID reader configured to read RFID tags, which may not require an optical line of sight.

Turning to the contents of the memory 802 in more detail, the memory 802 may include an operating system 830 and/or one or more application programs or services for implementing the features disclosed herein including the fixture management engine 222(2). In some examples, the fixture management engine 222(2) may be configured as described herein. The operating system 830 and/or the fixture management engine 222(2) may include functionality to cause presentation of indicators, record data associated with moving containers, record data associated with moving items, and other actions, and/or tasks associated with the container holding fixtures 100.

Figure 9:
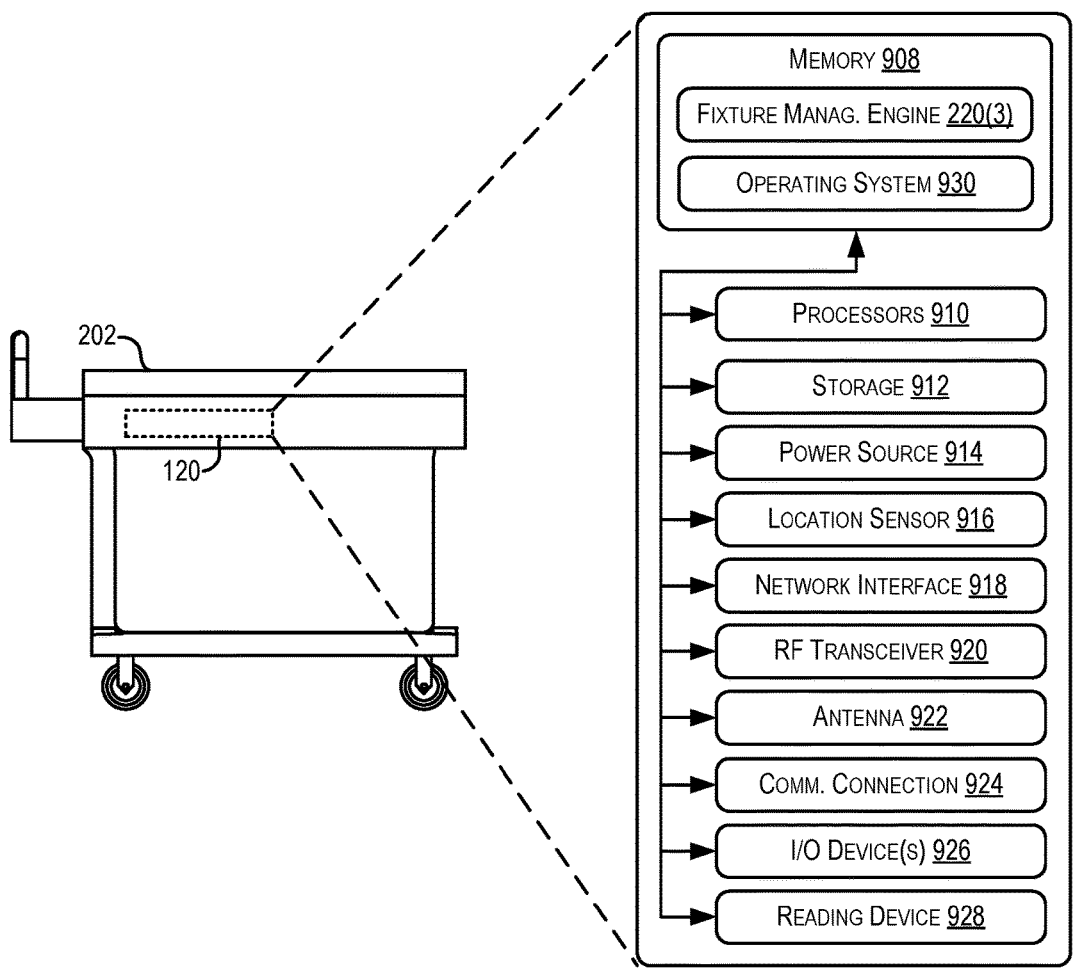
FIG. 9 illustrates a schematic representation of an example computing device of a container holding fixture for use in generating and providing location-based indications, according to at least one example.

FIG. 9 illustrates a schematic representation of the fixture computing device 120 for use in generating and providing location-based indications, according to at least one example. As introduced herein, this can include at least one memory 908 and one or more processing units (or processor(s)) 910. The processor(s) 910 may be implemented as appropriate in hardware, computer-executable instructions, firmware, or combinations thereof. Computer-executable instruction or firmware implementations of the processor(s) 910 may include computer-executable or machine-executable instructions written in any suitable programming language to perform the various functions described.

The memory 908 may store program instructions that are loadable and executable on the processor(s) 910, as well as data generated during the execution of these programs. Depending on the configuration and type of the fixture computing device 120, the memory 908 may be volatile (such as random access memory (RAM)) and/or non-volatile (such as read-only memory (ROM), flash memory, etc.). The fixture computing device 120 may also include additional removable storage and/or non-removable storage 912, which may provide non-volatile storage of computer-readable instructions, data structures, program modules, and other data for the computing devices. Turning to the contents of the memory 908 in more detail, the memory 908 may include an operating system 930 one or more application programs or services for implementing the features disclosed herein including the fixture management engine 222(3).

The fixture computing device 120 can also include a power source 914 configured to provide power to components of the fixture computing device 120. In some examples, the power source 914 is provided in addition to or instead of the power source 414. The fixture computing device 120 may also include a location sensor 916, a network interface 918, a radio-frequency (RF) transceiver 920, and an antenna 922. The location sensor 916 can include any sort of sensor that informs the fixture computing device 120 of its geolocation including, but not limited to, a Global Positioning System (GPS) based on satellites circling the Earth. The location sensor 916 may additionally or alternatively determine geolocation by radio signal triangulation (e.g., triangulation based on radio antenna signal strength), or receiving a notification from a fixed location (e.g., a beacon signal broadcasting a location).

The network interface 918 may be configured for wirelessly communicating via the networks 208. The network interface 918 may use any standard protocols for network communication. In some examples, the network interface 918 may use the antenna 922 to send and receive data from the network 208. In some examples, the network interface 918 may provide information to the location sensor 916 (e.g., a closest network access point) from which the location sensor 916 can infer or calculate a location of the fixture computing device 120.

The RF transceiver 920 may be configured to transmit and receive RF signals. For example, the RF transceiver 920 can function to communicate with passive and/or active RFID tags or other devices capable of receiving and/or providing information via RF signals.

The fixture computing device 120 may also include communication connection(s) 924, I/O device(s) 926, and a reading device 928. The communication connection(s) 924 may allow the fixture computing device 120 to communicate with a data store, another computing device or server, user terminals, and/or other devices via the networks 208. The I/O device(s) 926 may include a keypad, a touch screen, a display, and other I/O devices (e.g., a mouse, a pen, a voice input device, speakers, a printer, etc.). The reading device 928 may be configured to read a variety of different human-readable and machine-readable elements. For example, the reading device 928 can include an optical scanner configured to read barcodes. The reading device 928 can also include an RFID reader configured to read RFID tags, which may not require an optical line of sight.

FIGS. 10, 11, 12, 13, 14, 15, and 16 illustrate example flow diagrams showing respective processes 1000, 1100, 1200, 1300, 1400, 1500, and 1600 as described herein. These processes 1000, 1100, 1200, 1300, 1400, 1500, and 1600 are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes. The order in which the operations are described is not intended to be construed as a limitation, and any number of the described operations can be omitted or combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

Figure 10:
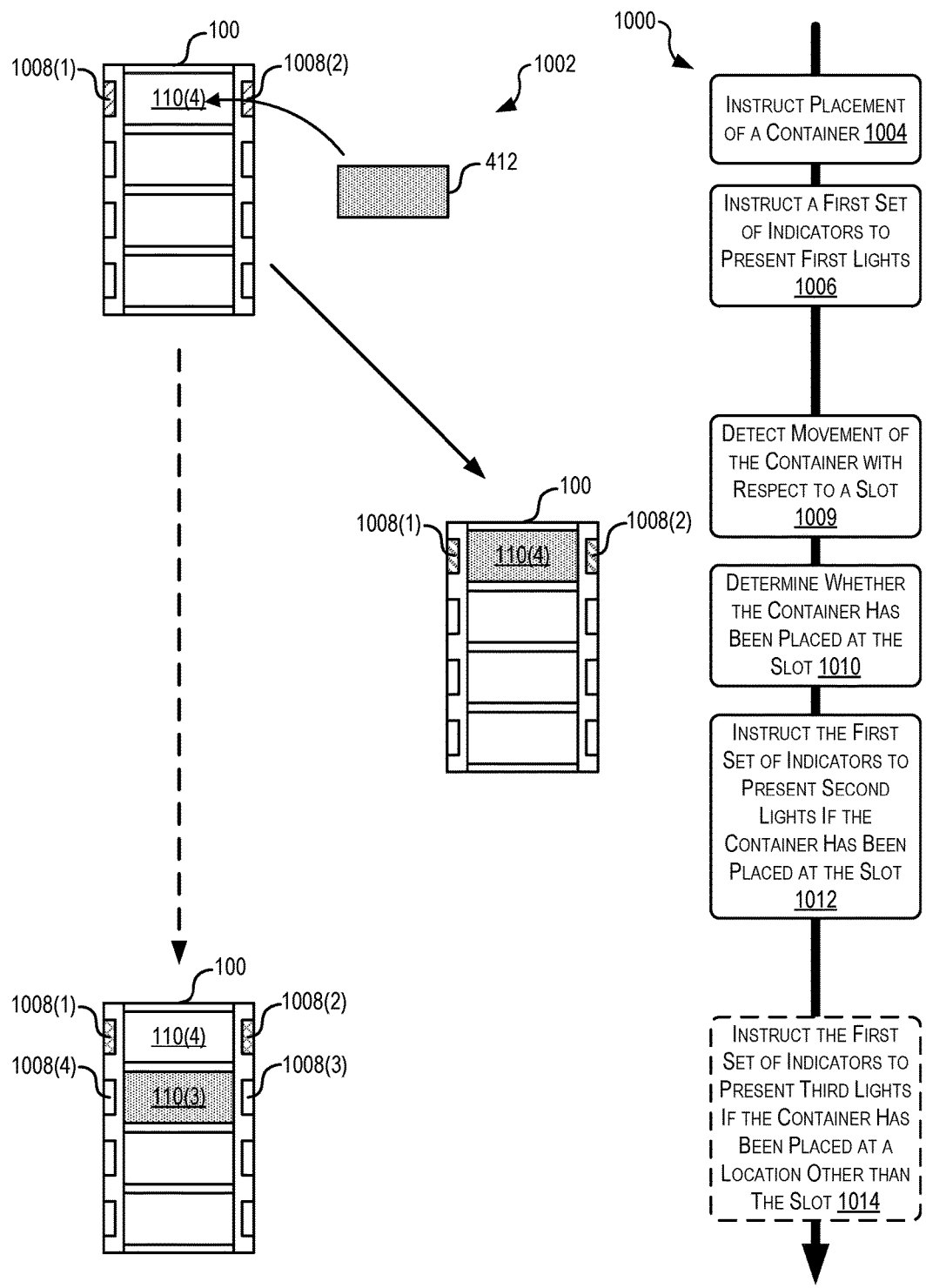
FIG. 10 illustrates a diagram and a process flow depicting example acts for implementing techniques relating generating and providing location-based indications, according to at least one example.

FIG. 10 illustrates a simplified block diagram 1002 depicting an example process 1000 for generating and providing location-based indications, according to at least one example. In particular, the process 1000 may depict a process for instructing placement of a new container at a slot using location-based indications. The fixture management engine 222(1), whether embodied in the fixture computing device 120, the inventory management system 206, the user device 204, or any suitable combination of the foregoing may perform the process 1000 of FIG. 10.

The process 1000 begins at 1004 by instructing placement of a container 412. This may be performed by the container movement module 302 (FIG. 3). Instructing placement of the container 412 may include making instructions available to a human user that will place the container. Placing the container 412 may include placing the container 412 within a slot such as the slot 110(4) of the container holding fixture 100. In some examples, instructing placement of the container is based at least in part on a customer order. For example, the customer order may be associated with slot 110(4) and/or the container 412 as part placing the container 412 at the slot 110(4).

At 1006, the process 1000 instructs a first set of indicators 1008(1), 1008(2) to present first lights. This may be performed by the indication presentation module 306 (FIG. 3). Instructing the first set of indicators 1008(1), 1008(2) to present the first set of lights may include sending a turn on signal to the first set of indicators 1008(1), 1008(2) to turn on one or more LEDs or other light sources. The first set of lights may emit light via light windows in the container holding fixture 100. The first set of lights may represent a waiting condition wherein the system executing the process 1000 is waiting for additional actions to be performed and/or additional information (e.g., waiting for placement of the container 412). In some examples, the first set of lights may emit blue light. The first set of indicators 1008(1), 1008(2) may visually identify the slot 110(4).

At 1009, the process 1000 detects movement of the container 412 with respect to a slot 110 of the container holding fixture 100. This may be performed by the container movement module 302. Detecting the movement of the container 412 may include sensing the movement using one or more sensors associated with the container holding fixture 100 (e.g., within the slots 110). For example, an RFID antenna may detect an RFID tag disposed in the container 412 when the container 412 is placed adjacent to the slot 110(4).

At 1010, the process 1000 determines whether the container 412 has been placed at the slot 110(4). This may be performed by the container movement module 302. Determining whether the container 412 has been placed may be based at least in part on the sensor data used to detect the movement at 1008. For example, if the sensor data indicates a continued sensing of the container 412 at the slot 110(4), it may inferred that the container 412 has been placed at the slot 110(4).

At 1012, the process 1000 instructs the first set of indicators 1008(1), 1008(2) to present second lights if the container 412 has been placed at the slot. This may be performed by the indication presentation module 306. The second set of lights may identify successful fulfillment of one or more conditions. In this example, the conditions may include placement of the container 412 at the slot 110(4). Because this was successfully performed and recognized (e.g., using sensor data, a signal generated by a manual action like pushing a button, scan data, etc.), the system executing the process 1000 instructs the first set of indicators 1008(1), 1008(2) to present the second lights. In some examples, the second lights may emit green light.

In some examples, if it cannot be determined that the container 412 was placed at the slot 110(4), the process 1000 may proceed to 1014. At 1014, the process 1000 instructs the first set of indicators to present third lights if the container 412 has been placed at a location other than at the slot 110(4). This may be performed by the indication presentation module 306. In some examples, the third lights may be presented in the event one or more expected conditions are not met. For example, the expected conditions may include detection of the container 412 at the slot 110(4). In this example, the container 412 was detected as being at the slot 110(3). Thus, the container 412 is located at a location other than the expected location (e.g., the slot 110(4)). This may represent an incorrect placement of the container 412. Thus, the third lights may emit a colored light that indicates an error state of the container holding fixture 100 (e.g., red light). In some examples, in addition to or instead of instructing the first set of indicators 1008(1), 1008(2) to present the third lights, a second set of indicators 1008(4), 1008(3) may be instructed to present the third lights.

Figure 11:
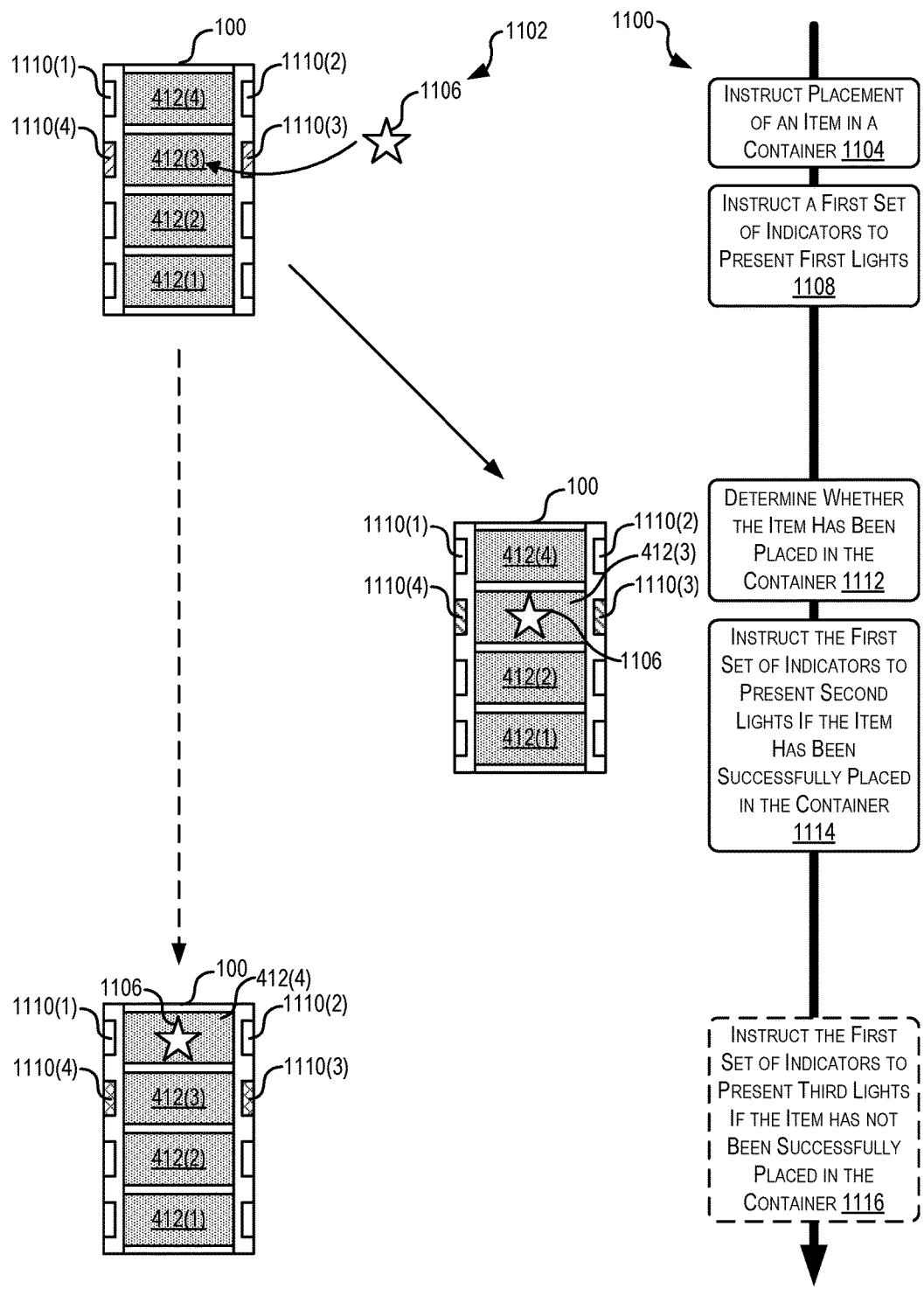
FIG. 11 illustrates a diagram and a process flow depicting example acts for implementing techniques relating generating and providing location-based indications, according to at least one example.

FIG. 11 illustrates a simplified block diagram 1102 depicting an example process 1100 for generating and providing location-based indications, according to at least one example. In particular, the process 1100 may depict a process for instructing placement of an item at a container using location-based indications. The fixture management engine 222(1), whether embodied in the fixture computing device 120, the inventory management system 206, the user device 204, or any suitable combination of the foregoing may perform the process 1100 of FIG. 11.

The process 1100 begins at 1104 by instructing placement of an item 1106 in a container 412(3). This may be performed by the item movement module 304 (FIG. 3). The item 1106 may be any suitable physical object that can be moved and placed in a container. Instructing placement of the item 1106 may include providing a set instructions requesting placement to a human user via a user device. In some examples, the process 1100 is performed as part of a pick process whereby the human user pushes a moveable cart including the container holding fixture 100 around a material handling facility and collects items to be included in customer orders. In some examples, each container 412 may be associated with one or more customer orders.

At 1108, the process 1100 instructs a first set of indicators 1110(3), 1110(4) to present first lights. This may be performed by the indication presentation module 306 (FIG. 3). Instructing the first set of indicators 1110(3), 1110(4) to present the first set of lights may include sending a turn on signal to the first set of indicators 1110(3), 1110(4) to turn on one or more LEDs or other light sources. The first set of lights may emit light via light windows in the container holding fixture 100. The first set of lights may represent a waiting condition wherein the system executing the process 1100 is waiting for additional actions to be performed and/or additional information (e.g., waiting for placement of the item 1106 into the container 412(3)). In some examples, the first set of lights may emit blue light. The first set of indicators 1110(3), 1110(4) may visually identify the container 412(3) and/or the slot at which the container 412(3) is located.

At 1112, the process 1100 determines whether the item 1106 has been placed in the container 412(3). This may be performed by the container movement module 302. Determining whether the item 1106 has been placed may be based at least in part on sensor data (e.g., RFID antenna data, weight sensor data, pressure sensor data, image data, optical sensor interruption data, etc.). Such sensor data may be analyzed to detect the presence of the item 1106 in the container 412(3) (e.g., within the slot at which the container 412(3) is located) by detecting changes in conditions present in the slot and/or the container 412(3). Determining whether the item 1106 has been placed may also be based at least in part on a signal generated by a manual action (e.g., pushing a button on the container holding fixture 100 corresponding to the slot at which the container 412(3) is located that indicates placement, pushing a button on the user device that indicates placement, scanning a barcode associated with the slot at which the container 412(3) is located and/or a barcode associated with the container 412(3) itself, etc.) and/or any other suitable information useable for detecting placement.

At 1114, the process 1100 instructs the first set of indicators 1110(3), 1110(4) to present second lights if the item 1106 has been successfully placed in the container 412(3). This may be performed by the indication presentation module 306. The second set of lights may identify successful fulfillment of one or more conditions. In this example, the conditions may include placement of the item 1106 at the container 412(3). Because this was successfully performed and recognized (e.g., using sensor data, a signal generated by a manual action like pushing a button, scan data, etc.), the system executing the process 1100 instructs the first set of indicators 1110(3), 1110(4) to present the second lights. In some examples, the second lights may emit green light. The second lights may be presented to inform the user of the successful placement. In this manner, the user may move on to a next task.

In some examples, if it cannot be determined that the item 1106 was placed at the container 412(3), the process 1100 may proceed to 1116. At 1116, the process 1100 instructs the first set of indicators to present third lights if the item 1106 has not been successfully placed in the container 412(3). This may be performed by the indication presentation module 306. In some examples, the third lights may be presented in the event one or more expected conditions are not met. For example, the expected conditions may include detection of the item 1106 at the container 412(3) and/or at the slot where the container 412(3) is located. In this example, the item 1106 was detected as being in the container 412(4). Thus, the item 1106 is located at a location other than the expected location (e.g., the container 412(3)). This may represent an incorrect placement of the item 1106. Thus, the third lights may emit a colored light that indicates an error state of the container holding fixture 100 (e.g., red light). In some examples, in addition to or instead of instructing the first set of indicators 1110(3), 1110(4), to present the third lights, a second set of indicators 1110(1), 1110(2) may be instructed to present the third lights.

Figure 12:
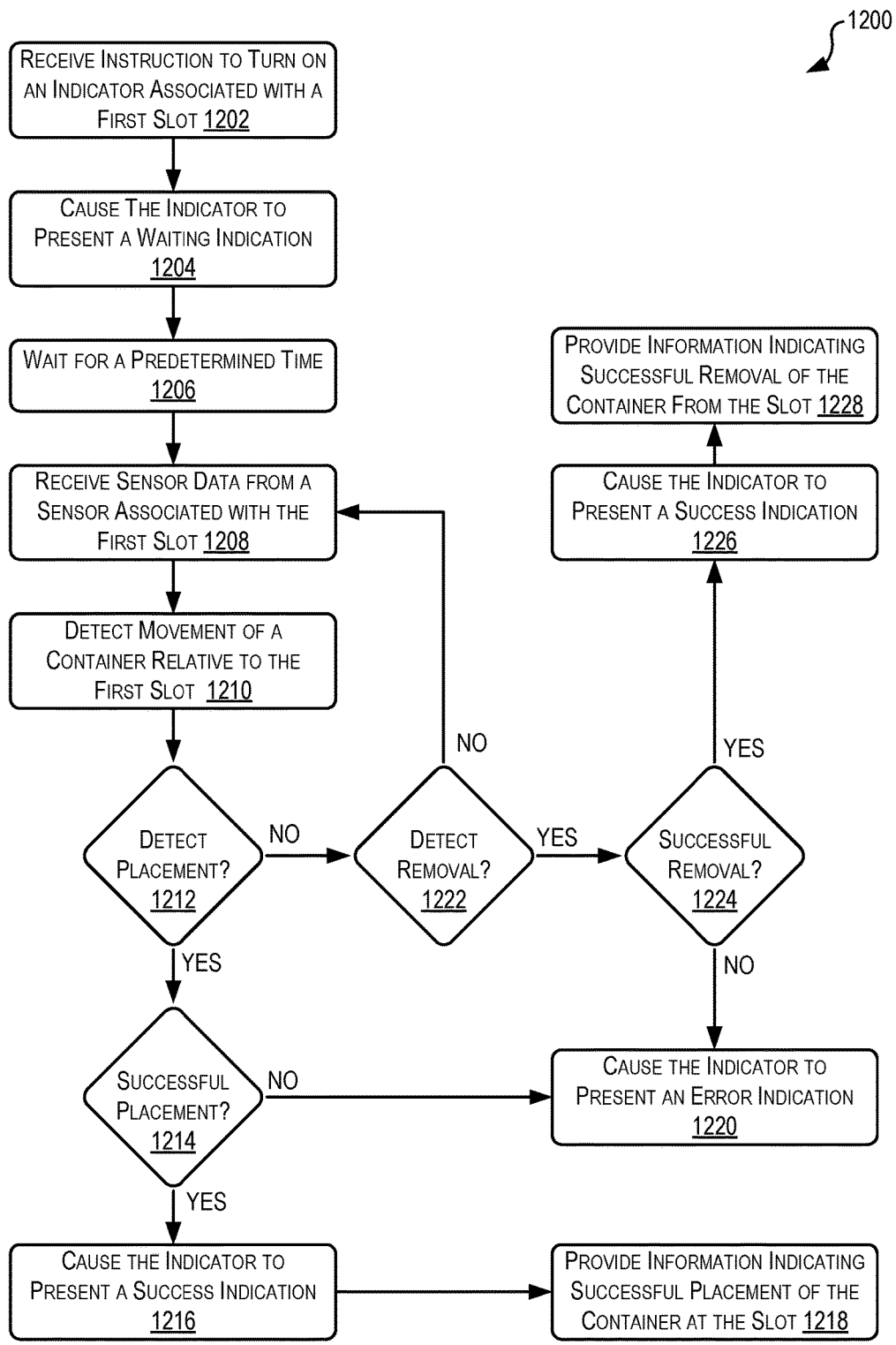
FIG. 12 illustrates a flow diagram depicting example acts for implementing techniques relating generating and providing location-based indications, according to at least one example.

FIG. 12 illustrates an example process 1200 for generating and providing location-based indications, according to at least one example. In particular, the process 1200 may depict a process for detecting successful placement and/or removal of containers and presenting location-based indications based on the detecting. The fixture management engine 222(1), whether embodied in the fixture computing device 120, inventory management system 206, the user device 204, or any suitable combination of the foregoing may perform the process 1200 of FIG. 12. The process 1200 begins at 1202 by receiving instruction to turn on an indicator associated with a first slot. This may be performed by the indication presentation module 306 (FIG. 3). In some examples, the instruction may be received from the inventory management system 206 and/or from the user device 204. The indicator may indicate to a user to remove a container or to place a container.

At 1204, the process 1200 causes the indicator to present a waiting indication. This may be performed by the indication presentation module 306. In some examples, causing the indicator to present the waiting condition may include sending a turn on signal to the indicator to turn on a subset of a set of LEDs to present the waiting indication. In some examples, the waiting indication may be associated directly with the indicator. The waiting indication may represent that the system is waiting for additional information. In some examples, the waiting indication may be a light of a certain color (e.g., blue), a sound having a particular tone, a spoken message (e.g., "waiting . . . waiting . . . waiting"), or any other suitable indication.

At 1206, the process 1200 waits for a predetermined time. In some examples, this may be performed by the indication presentation module 306. Waiting for the predetermined time may be useful while the process 1200 waits for the fulfillment of certain conditions. For example, the process may wait while a user places a container at the first slot or removes the container from the first slot. In some examples, waiting for the predetermined time ensures that the user is given adequate time to move the container relative to the first slot.

At 1208, the process 1200 receives sensor data from a sensor associated with the first slot. This may be performed by the container movement module 302 (FIG. 3). The sensor data may be generated by a sensor that senses changes in present conditions of the first slot. For example, the sensor data may include RFID data collected by an RFID antenna disposed in the first slot. The RFID data may identify a particular RFID tag associated with a container.

At 1210, the process 1200 detects movement of a container relative to the first slot. This may be performed by the container movement module 302. Detecting movement of the container may be based at least in part on the sensor data received at 1208. As discussed above, the sensor data may uniquely identify the container (e.g., RFID data that identifies the RFID tag on the container).

At 1212, the process 1200 determines whether the movement detected at 1210 includes placement of the container. This may be performed by the container movement module 302. Placement of the container may include placement of the container at the first slot. For example, if the sensor data were pressure sensor data, then detecting placement of the container at the first slot may include detecting an increase in pressure at the first slot based at least in part on the sensor data. If the sensor data were RFID data, then detecting placement of the container at the first slot may include detecting the presence of an RFID tag associated with the container at the first slot based at least in part on the sensor data.

If the movement includes detected placement (e.g., the answer at 1212 is YES), the process 1200 proceeds to 1214. At 1214, the process 1200 determines whether the placement was successful. This may be performed by the container movement module 302. Detecting successful placement may include determining that the sensor data indicates a steady state condition of the sentence or the slot whereby it can confidently be inferred that the container is located at the first slot. In some examples, the determination at 1214 may be further based at least in part on additional information provided by a human user that participates in the process 1200. For example, the human user may provide some input (e.g., via a manual button, via the user device, etc.) that indicates successful placement of the container.

If the placement is successful (e.g., the answer at 1214 is YES), the process 1200 proceeds to 1216. At 1216, the process 1200 causes the indicator to present a success indication. This may be performed by the indication presentation module 306. In some examples, the success indication may indicate that the container has been successfully placed at the first slot. In some examples, the success indication may be a light of a certain color (e.g., green), a sound having a particular tone, a spoken message (e.g., "success . . . success . . . success"), or any other suitable indication.

At 1218, the process 1200 provides information indicating successful placement of the container at the slot. This may be performed by the container movement module 302. The information may be provided to a computing device configured to track interactions at a container holding fixture where the first slot is located. In some examples, the information may be used to update a record associated with the container holding fixture and/or the container. For example, the container may be associated with a customer order and used to hold items belonging to the customer order in the future. In some examples, the information may be processed to determine whether the human user performed properly performed the action instructed earlier. In this manner, the information may be used as feedback to track performance metrics. In some examples, other metrics may be tracked using techniques described herein. For example, the metrics may be compiled and tracked as part of a user profile of the human user. The metrics may be used to assessing the human users.

If the placement is unsuccessful (e.g., the answer at 1214 is NO), the process 1200 proceeds to 1220. At 1220, the process 1200 causes the indicator to present an error indication. This may be performed by the indication presentation module 306. In some examples, the error indication may indicate that the container has not been successfully placed at the first slot. In some examples, the error indication may be a light of a certain color (e.g., red), a sound having a particular tone, a spoken message (e.g., "error . . . error . . . error"), or any other suitable indication.

Returning to 1212, if the movement does not include detected placement (e.g., the answer at 1212 is NO), the process 1200 proceeds to 1222. At 1222, the process 1200 determines whether the detected movement includes removal of the container from the first slot. This may be performed by the container movement module 302. Removal of the container may include removing the container from the first slot. For example, if the sensor data were pressure sensor data, then detecting removal of the container at the first slot may include detecting a decrease in pressure at the first slot based at least in part on the sensor data. If the sensor data were RFID data, then detecting removal of the container at the first slot may include detecting the absence of an RFID tag associated with the container at the first slot based at least in part on the sensor data.

If the movement does not include detected removal (e.g., the answer at 1222 is NO), the process 1200 returns to 1208 where sensor data is received. If the movement includes detected removal (e.g., the answer at 1222 is YES), the process 1200 proceeds to 1224. At 1224, the process 1200 determines whether the detected removal was successful. This may be performed by the container movement module 302. Detecting successful removal may include determining that the sensor data indicates a steady state condition of the container or the slot whereby it can confidently be inferred that the container has been removed from the first slot. In some examples, the determination at 1224 may be further based at least in part on additional information provided by a human user that participates in the process 1200. For example, the human user may provide some input (e.g., via a manual button, via the user device, etc.) that indicates successful removal of the container.

If the removal is successful (e.g., the answer at 1224 is YES), the process 1200 proceeds to 1226. At 1226, the process 1200 causes the indicator to present a success indication. This may be performed by the indication presentation module 306. In some examples, the success indication may indicate that the container has been successfully removed at the first slot. In some examples, the success indication may be a light of a certain color (e.g., green), a sound having a particular tone, a spoken message (e.g., "success . . . success . . . success"), or any other suitable indication.

At 1228, the process 1200 provides information indicating successful removal of the container from the slot. This may be performed by the container movement module 302. The information may be provided to a computing device configured to track interactions at a container holding fixture where the first slot is located like at 1218.

If the removal is unsuccessful (e.g., the answer at 1224 is NO), the process 1200 proceeds to 1220. At 1220, the process 1200 causes the indicator to present an error indication.

Figure 13:
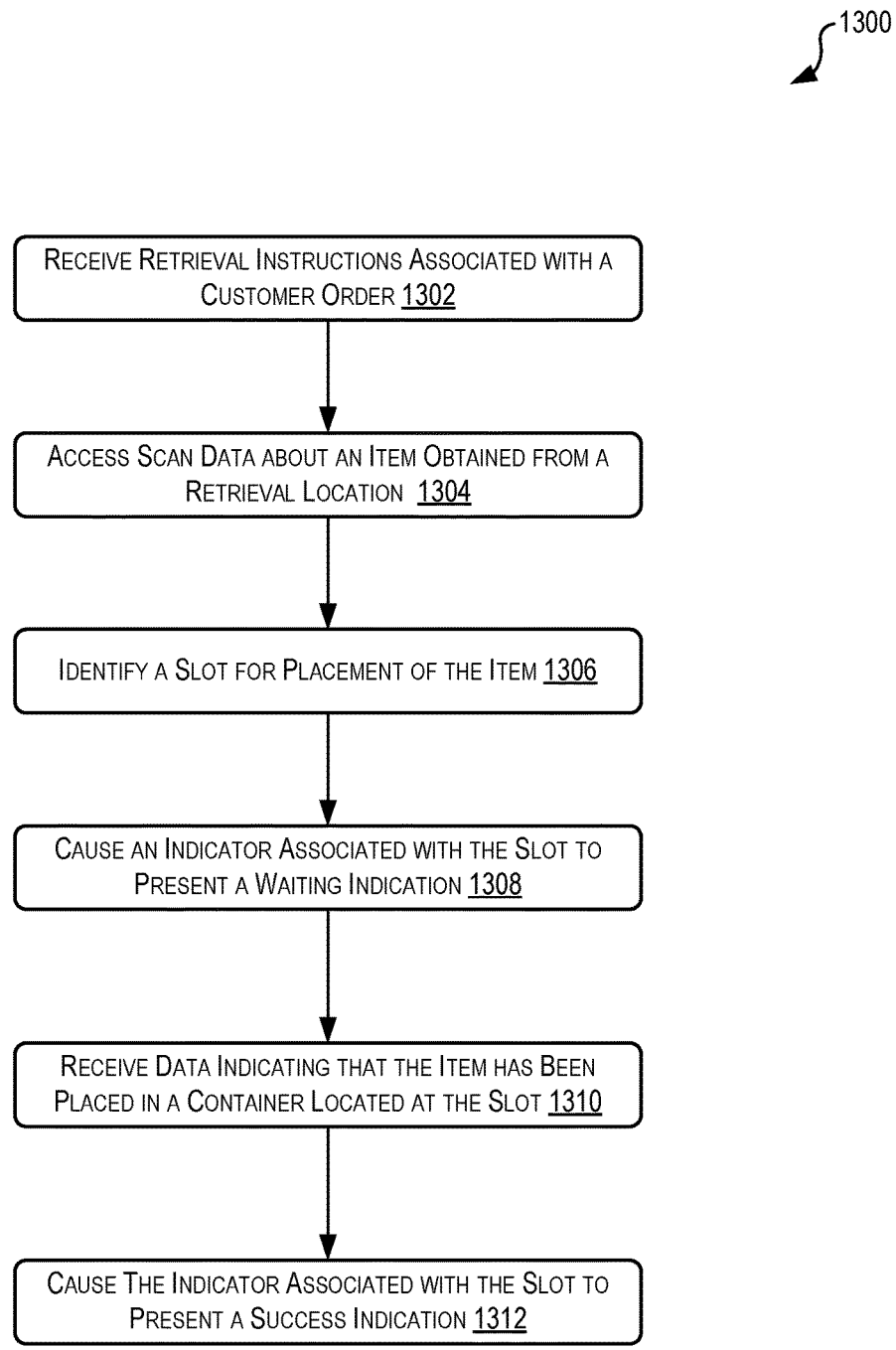
FIG. 13 illustrates a flow diagram depicting example acts for implementing techniques relating generating and providing location-based indications, according to at least one example.

FIG. 13 illustrates an example process 1300 for generating and providing location-based indications, according to at least one example. In particular, the process 1300 may depict a process for instructing retrieval and placement of an item using location-based indications. The fixture management engine 222(1), whether embodied in the fixture computing device 120, the inventory management system 206, the user device 204, or any suitable combination of the foregoing may perform the process 1300 of FIG. 13.

The process 1300 begins at 1302 by receiving retrieval instructions associated with a customer order. This may be performed by the container movement module 302 (FIG. 3). In some examples, the instructions may be received from the inventory management system 206 and/or from the user device 204. The retrieval instruction may identify a physical location of an item in an item storage system such as a material handling facility.

At 1304, the process 1300 accesses scan data about an item obtained from the retrieval location. This may be performed by the container movement module 302. In some examples, the scan data may be obtained by scanning the item using an optical scanner of a user device. The item may be identified and, once scanned, may be associated with a customer order. The customer order may include items from a plurality of retrieval locations.

At 1306, the process 1300 identifies a slot for placement of the item. This may be performed by the container movement module 302. In some examples, identifying the slot for placement of the item may be based at least in part on the customer order. For example, the customer order may be associated with the slot and/or a container held at the slot. Likewise the item may be associated with the customer order. Placing the item at the slot may effectively associate the item with the slot and/or the container held at the slot.

At 1308, the process 1300 causes an indicator associated with the slot to present a waiting indication. In some examples, this may be performed by the indication presentation module 306 (FIG. 3). The waiting indication may be presented to identify the slot and to draw the user's attention to the slot. The indication may be considered a waiting condition because the system is waiting for additional actions to be performed.

At 1310, the process 1300 receives data indicating that the item has been placed in a container located at the slot. This may be performed by the item movement module 304. The data may be sensor data, data generated in response to an action, or any other suitable data as described herein. At this point, the waiting indicator may be turned off.

At 1312, the process 1300 causes the indicator associated with the slot to present a success indication. This may be performed by the indication presentation module 306. The success indication may be presented to indicate that the task associated with the container and/or slot has been successfully completed.

Figure 14:
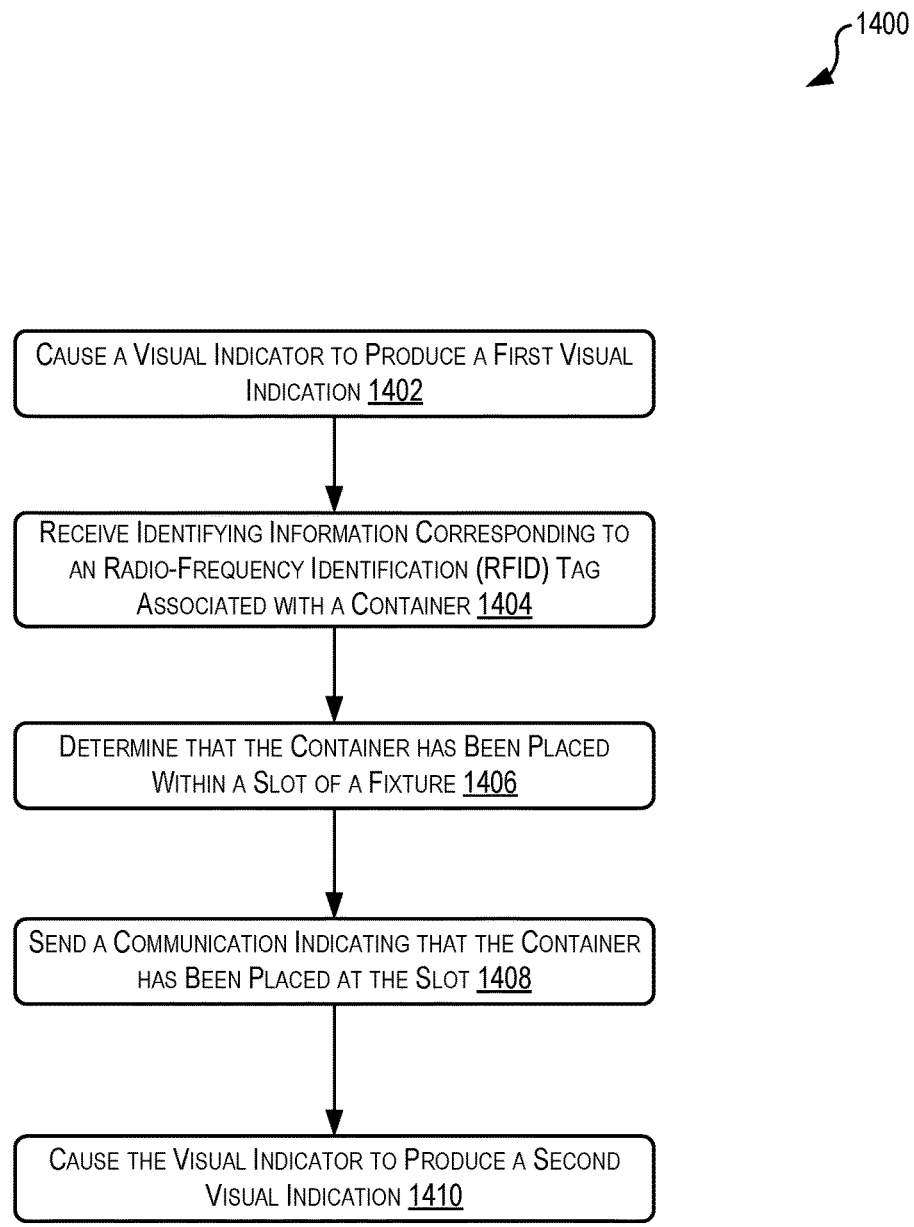
FIG. 14 illustrates a flow diagram depicting example acts for implementing techniques relating generating and providing location-based indications, according to at least one example.

FIG. 14 illustrates an example process 1400 for generating and providing location-based indications, according to at least one example. In particular, the process 1400 may depict a process for using location-based indicators to instruct placement of a container at a slot. The fixture management engine 222(1), whether embodied in the fixture computing device 120, the inventory management system 206, the user device 204, or any suitable combination of the foregoing may perform the process 1400 of FIG. 14.

The process 1400 begins at 1402 by causing a visual indicator to produce a first visual indication. This may be performed by the indication presentation module 306 (FIG. 3). In some examples, causing the visual indicator to produce a first visual indication may be based at least in part on an availability of a slot to receive a container.

At 1404, the process 1400 receives identifying information corresponding to a radio-frequency identification (RFID) tag associated with a container. This may be performed by the container movement module 302 (FIG. 3). In some examples, receiving the identifying information may be at least in response to an RFID reader reading the RFID tag.

At 1406, the process 1400 determines that the container has been placed within a slot of a fixture. This may be performed by the container movement module 302. In some examples, determining that the container has been placed may be based at least in part on the identifying information.

At 1408, the process 1400 sends a communication indicating that the container has been placed at the slot. This may be performed by the container movement module 302. In some examples, the communication may be sent to an external computing device based at least in part on determining that the container has been placed at the slot. In some examples, the external computing device is a handheld scanner that is configured to at least: use the communication indicating that the container has been placed at the slot to associate the container with a customer order, identify an item of the customer order by scanning a machine-readable code associated with the item, and provide an instruction that causes the visual indicator to produce a third visual indication. The third visual indication may identify the slot including the container as a location for placement of the item.

At 1410, the process 1400 causes the visual indicator to produce a second visual indication. This may be performed by the indication presentation module 306. In some examples, the visual indicator may be caused to produce the second visual indication based at least in part on determining that the container has been placed at the slot.

In some examples, the process 1400 may further include causing a second visual indicator to produce a third visual indication based at least in part on an availability of a second slot to receive a second container. The process 1400 may further include receiving, via the RFID reader, second identifying information corresponding to a second RFID tag associated with the second container at least in response to the RFID reader reading the second RFID tag. The process 1400 may further include determining that the second container has been placed someplace other than the second slot based at least in part on the identifying information. The process 1400 may further include, based at least in part on determining that the second container has been placed someplace other than the second slot, causing the second visual indicator to produce a fourth visual indication. In some examples, the first visual indication and the third visual indications share a first visual characteristic. In some examples, the second visual indication has a second visual characteristic and the fourth visual indication has a third visual characteristic. The visual characteristics may include colors, flash rates, etc.

Figure 15:
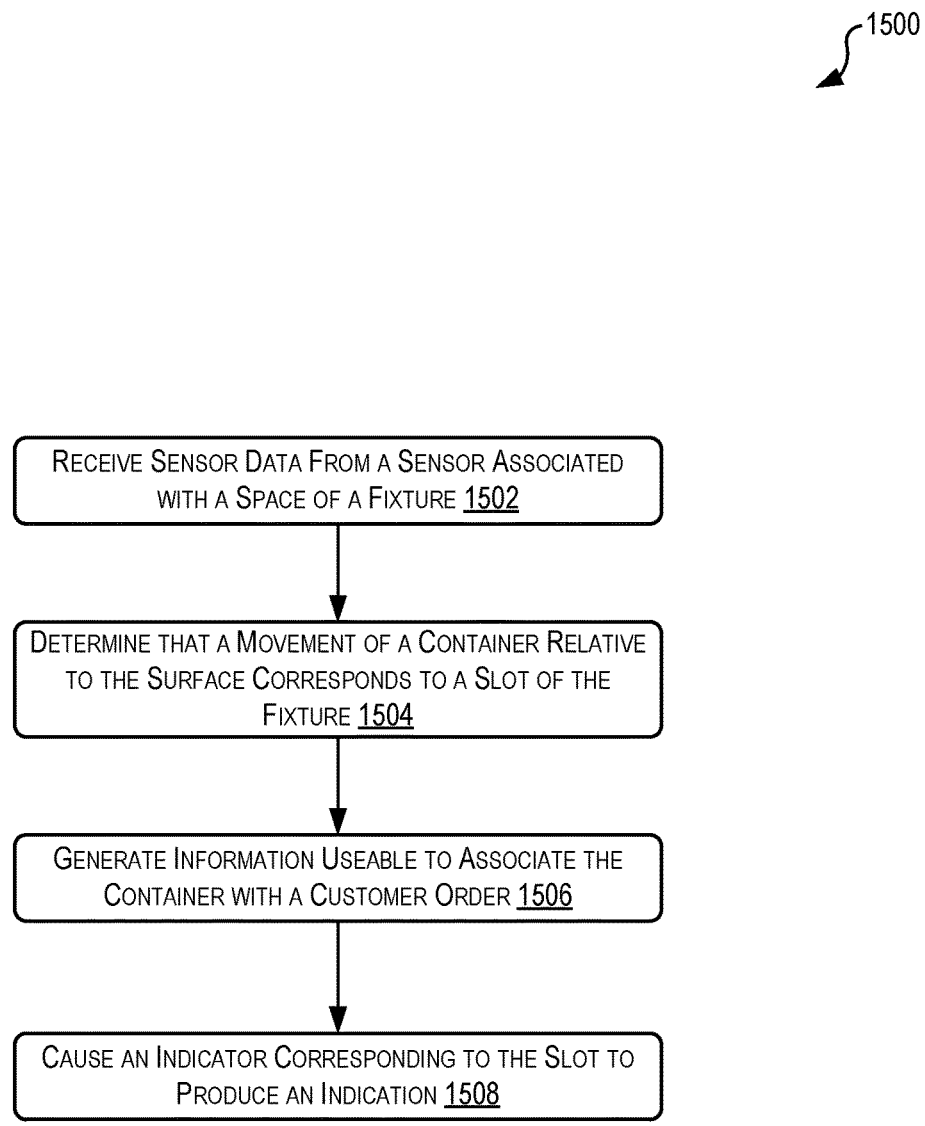
FIG. 15 illustrates a flow diagram depicting example acts for implementing techniques relating generating and providing location-based indications, according to at least one example.

FIG. 15 illustrates an example process 1500 for generating and providing location-based indications, according to at least one example. In particular, the process 1500 may depict a process for using location-based indicators to instruct movement of an item relative to a slot. The fixture management engine 222(1), whether embodied in the fixture computing device 120, the inventory management system 206, the user device 204, or any suitable combination of the foregoing may perform the process 1500 of FIG. 15.

The process 1500 begins at 1502 by receiving sensor data from a sensor associated with a space of a fixture. In some examples, this may be performed by the container movement module 302 (FIG. 3). The fixture may include a set of slots. The sensor data may indicate that the sensor has sensed a condition of a container relative to the space. In some examples, the space may include a volume of air surrounding the slot. For example, when the sensor is disposed below the slot, the space may include a volume of air disposed above the slot (e.g., a cube, a cylinder, a rectangle, etc.).

At 1504, the process 1500 determines that condition of the container relative to the space corresponds to a slot of the fixture. This may be performed by the container movement module 302. Determining that the condition of the container relative to the space corresponds to the slot may be based at least in part on the sensor data. In some examples, the condition includes a presence of the container with respect to the slot. Based at least in part on the presence of the container with respect to the slot, it may be determined that the container has been placed at the slot. In some examples, the condition includes an absence of the container with respect to the slot. Based at least in part on the absence of the container with respect to the slot, it may be determined that the container has been removed from the slot.

At 1506, the process 1500 generates information usable to associate the container with a record such as a customer order. This may be performed by the container movement module 302.

At 1508, the process 1500 causes an indicator corresponding to the slot to produce an indication. This may be performed by the indication presentation module 306 (FIG. 3). In some examples, the indication identifies a recommended slot for placement of the container. In some examples, the indication indicates that the container was successfully placed at the slot.

In some examples, the indication is a first indication that identifies the slot prior to the sensor data sensing the condition of the container relative to the space. In this example, the process 1500 may further include causing the indicator corresponding to the slot to produce a second indication that identifies the slot after determining that the condition corresponds to the slot. In some examples, the first indication may include a first colored light and the second indication may include a second colored light.

In some examples, the indication is a first indication. In this example, the process 1500 further includes, in response to receiving a communication from an external computing device such as a handheld scanner, causing the indicator corresponding to the slot to produce a second indication that identifies the slot as a location for placement of an item that is associated with the record.

In some examples, the sensor data received at 1502 is first sensor data. The process 1500 may further include receiving second sensor data from a second sensor. The second sensor data may indicate that the second sensor has sensed a second condition of a second container relative to the space. The process 1500 may further include determining that the second condition corresponds to a second slot of the set of slots based at least in part on the second sensor data. The process 1500 may further include causing a second indicator corresponding to the second slot to produce a second indication that indicates that the second condition was unexpected.

In some examples, the process 1500 may further include receiving second sensor data from a second sensor. The second sensor data may indicate that the second sensor has sensed a second condition of an item relative to a second slot. The process 1500 may further include causing a second indicator corresponding to the second slot to produce a second indication at least in response to receiving the second sensor data. In some examples, the first sensor is a first RFID sensor and the second sensor is at least one of a second RFID sensor, a pressure sensor, a weight sensor, or an optical sensor.

Figure 16:
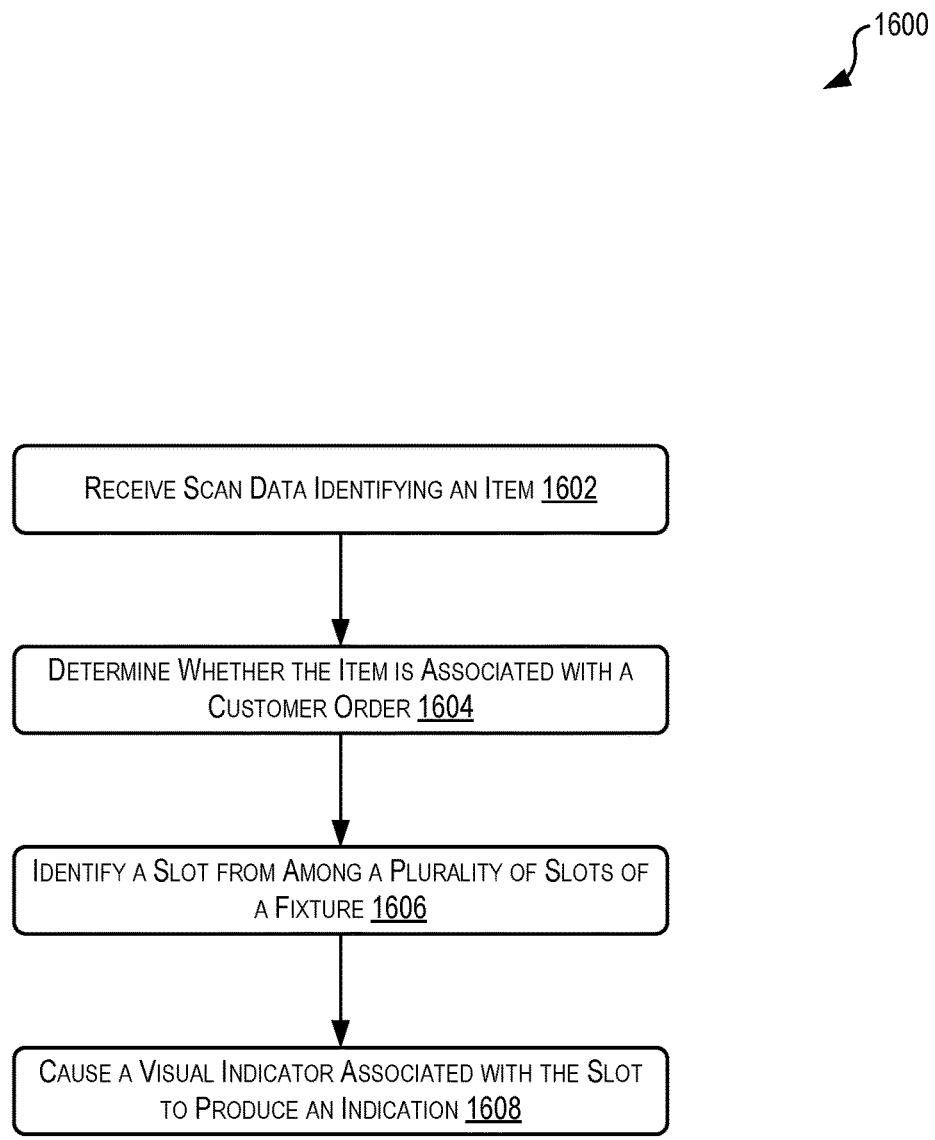
FIG. 16 illustrates a flow diagram depicting example acts for implementing techniques relating generating and providing location-based indications, according to at least one example.

FIG. 16 illustrates an example process 1600 for generating and providing location-based indications, according to at least one example. In particular, the process 1600 may depict a process for using location-based indicators to instruct placement of a container at a slot. The fixture management engine 222(1), whether embodied in the fixture computing device 120, the inventory management system 206, the user device 204, or any suitable combination of the foregoing may perform the process 1600 of FIG. 16.

The process 1600 begins at 1602 by receiving scan data identifying an item. In some examples, this may be performed by the container movement module 302 (FIG. 3).

At 1604, the process 1600 determines whether the item is associated with a customer order. This may be performed by the container movement module 302. Determining whether item is associated with a customer order may be based at least in part on the scan data.

At 1606, the process 1600 identifies a slot from among a plurality of slots of a fixture. This may be performed by the container movement module 302. In some examples, identifying the slot may be performed in the event the item is associated with the customer order. The fixture may be adapted for transportation on an item cart.

At 1608, the process 1600 causes a visual indicator associated with the slot to produce an indication. This may be performed by the indication presentation module 306 (FIG. 3). In some examples, causing the visual indicator to produce the indication may be based at least in response to identifying the slot. In some examples, the indication may at least identify the slot. In some examples, causing the visual indicator to produce the indication may include providing a communication to a fixture computing device that causes the fixture computing device to initiate a light source that produces the indication.

In some examples, the process 1600 may further include, prior to receiving the scan data, receiving an item retrieval instruction. The item retrieval instruction may identify a physical location of the item in an item storage system.

In some examples, the scan data is first scan data and the indication is a first indication. The method may further include receiving second scan data identifying the slot. The method may further include, at least in response to receiving the second scan data, causing the visual indicator to produce a second indication.

In some examples, the computing device is a handheld scanner including an optical sensor. The method may further include the first scan data and the second scan data being obtained by the optical scanner.

In some examples, the indication is a first indication. The method may further include, prior to causing the visual indicator to produce an indication: providing, to a fixture computing device, a first communication that causes the fixture computing device to instruct the visual indicator to produce a second indication that identifies the slot. The method may further include receiving, from the fixture computing device, a second communication that a container has been placed at the slot. The method may further include associating the container with the customer order.

Figure 17:
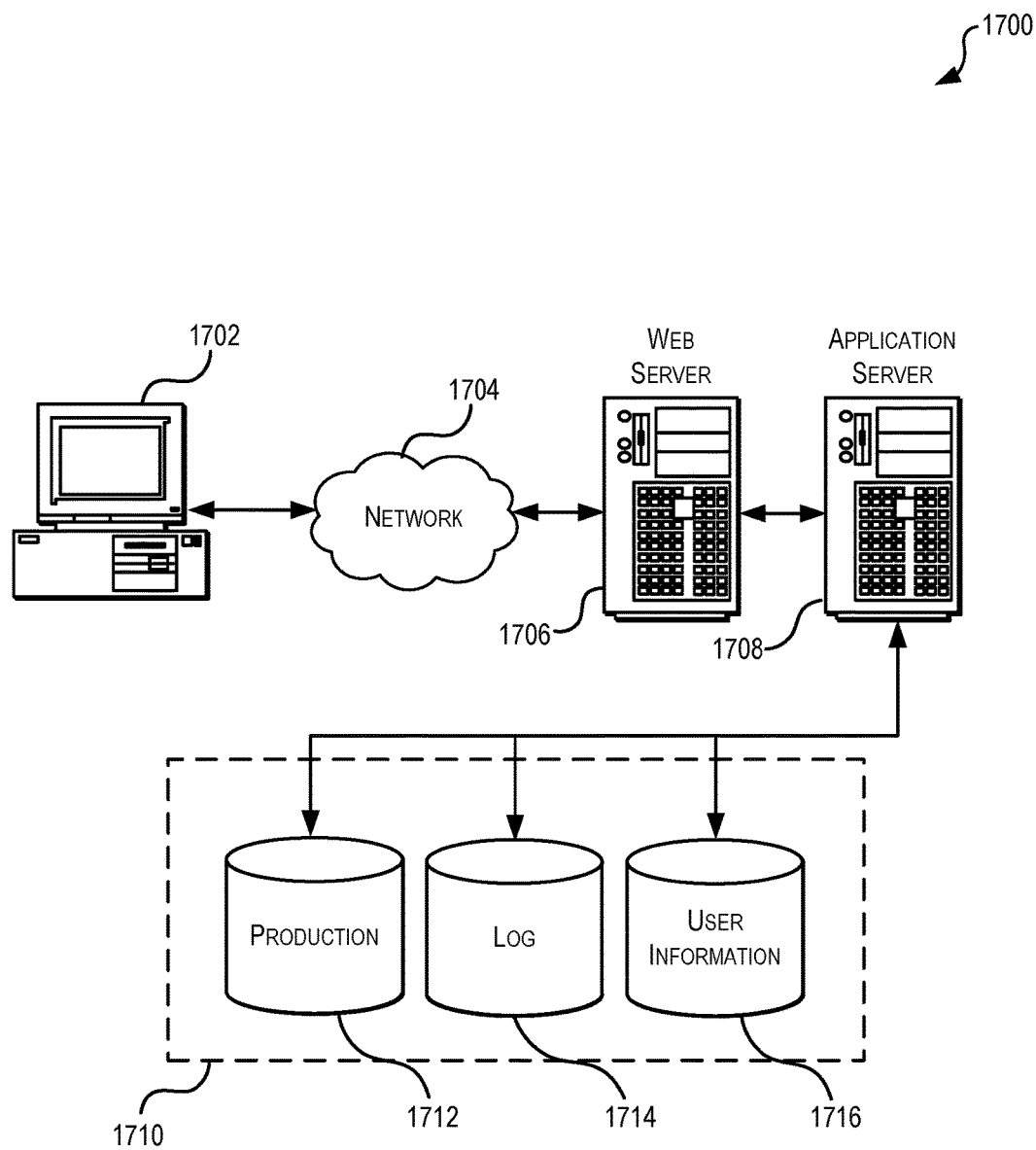
FIG. 17 illustrates an environment in which various embodiments can be implemented.

FIG. 17 illustrates aspects of an example environment 1700 for implementing aspects in accordance with various embodiments. As will be appreciated, although a Web-based environment is used for purposes of explanation, different environments may be used, as appropriate, to implement various embodiments. The environment includes an electronic client device 1702, which can include any appropriate device operable to send and receive requests, messages, or information over an appropriate network 1704 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1706 for receiving requests and serving content in response thereto, although for other networks an alternative device serving a similar purpose could be used as would be apparent to one of ordinary skill in the art.

The illustrative environment includes at least one application server 1708 and a data store 1710. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1702 and the application server 1708, can be handled by the Web server. It should be understood that the Web and application servers are not required and are merely example components, as structured code discussed herein can be executed on any appropriate device or host machine as discussed elsewhere herein.

The data store 1710 can include several separate data tables, databases or other data storage mechanisms and media for storing data relating to a particular aspect. For example, the data store illustrated includes mechanisms for storing production data 1712 and user information 1716, which can be used to serve content for the production side. The data store also is shown to include a mechanism for storing log data 1714, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1710. The data store 1710 is operable, through logic associated therewith, to receive instructions from the application server 1708 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the client device 1702. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions.

Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 17. Thus, the depiction of the system 1700 in FIG. 17 should be taken as being illustrative in nature and not limiting to the scope of the disclosure.

Generally, RFID refers to a wireless, non-contacting system for transferring data by way of radio frequency electromagnetic fields. In an RFID system, data transfers occur in the form of modulated signals transmitted between an RFID tag (or an RFID device), which may include various communication components, logic or circuitry, and an RFID reader, which may include antennas or other like devices. Data stored within a microchip or other storage device associated with the RFID tag may be sent to the RFID reader, which may interpret not only the data received in the RFID signal but also other relevant information or attributes of the RFID signal, such as an intensity or a frequency of the RFID signal, as well as a direction from which the RFID signal originated, a range traveled by the RFID signal or at least some of the information or data included in the RFID signal. The transfer of the RFID signal is initiated when an electric field or a magnetic field transmitted by an RFID reader is sensed by an RFID tag, which transmits information or data that may be stored in association with the RFID tag in one or more microchips or other storage devices.

RFID systems provide a number of advantages over similar systems for the short-range transfer of information or data. First, an RFID tag may be formed of components having remarkably small, compact shapes and sizes, and tags that are as thin as a sheet of paper or smaller than a grain of rice are quite common. Additionally, unlike a bar code (e.g., a one-dimensional bar code or a two-dimensional "QR" code), an RFID tag need not be provided within a line of sight of an RFID reader in order to successfully transmit data. Therefore, RFID tags may be concealed or embedded into many different types of objects of any size or shape, as well as humans or other animals. Next, an RFID tag may be programmed with a fixed set or packet of "read-only" data which may be transmitted to an RFID reader countless number of times in theory, or reprogrammed with modifiable sets of data that may be written and rewritten, as needed, based on the application in which the RFID tag is provided. Moreover, and perhaps most importantly, while an active RFID tag includes and utilizes a local power source, such as a battery, a passive RFID tag does not require any power in order to successfully transmit a set or packet of data to an RFID reader, and may therefore transmit such data when power supplies are unavailable or in environments where providing power to the RFID tag is infeasible.

RFID signals may be transmitted from an RFID tag to an RFID reader in many different formats and at many different frequency levels. An RFID tag that transmits signals within low frequency (LF), medium frequency (MF) or high frequency (HF) levels (e.g., approximately 3 kilohertz to 30 megahertz, or 3 kHz-30 MHz) may transfer relatively small-sized sets or packets of data over short ranges (e.g., between ten and one hundred centimeters, or 10-100 cm). Other RFID tags may transmit signals at higher frequency levels, such as ultrahigh frequency (UHF) or microwave levels (e.g., approximately 300 megahertz to 300 gigahertz, or 300 MHz-300 GHz) including larger sets or packets of data at ranges of one meter (1 m) or longer.

A signal transmission from an RFID tag to an RFID reader may be achieved in any number of ways. An inductively coupled RFID tag is an RFID tag that is powered by energy obtained from magnetic fields generated by an RFID reader, and may be coupled to the RFID reader using this energy. In this regard, an RFID reader may include one or more coils through which an electric current may pass, thereby causing a magnetic field to be generated by the RFID reader according to Ampere's Law. Likewise, an inductively coupled RFID tag may also include one or more coils. When the RFID tag passes within a particular range of the RFID reader, an electric current is generated within the coils of the RFID tag, thereby coupling the RFID reader and the RFID tag based on the magnetic flux passing through the respective sets of coils. The electric current passing through the coils of the RFID tag may then power internal circuits within the RFID tag, and cause an RFID signal to be transmitted from the RFID tag to the RFID reader accordingly. Thus, inductively coupled RFID tags are commonly used in powerless environments where a passive system for transmitting signals may be required.

Additionally, an RFID tag may be coupled by any number of other modes. For example, capacitively coupled RFID tags include coupling plates that are designed to correspond to a plate of an RFID reader. When the RFID tag is placed in sufficiently close proximity to the RFID reader, thereby causing the corresponding coupling plates of the RFID tag and the RFID reader to be aligned in parallel with one another and within a short range, a transfer of data from the RFID tag to the RFID reader is achieved. Unlike an inductively coupled RFID tag, which is powered by a magnetic field generated by an RFID reader, a capacitively coupled RFID tag is powered by an alternating electric field generated by an RFID reader. For this reason, capacitively coupled RFID tags usually have more limited operating ranges than inductively coupled RFID tags and are typically employed in near-field communication environments. Similarly, a backscatter-coupled RFID tag receives power emitted from an RFID reader's antenna. A portion of the emissions from the RFID reader is received by a corresponding antenna of the RFID tag and may be filtered or rectified, as necessary, in order to trigger a transfer of data from the RFID tag to the RFID reader. Any type or mode of coupling between an active, semi-active (e.g., powered on a temporary basis or for limited purposes) or passive RFID tag and an RFID reader may be utilized in accordance with the present description.

In addition to RFID tags which are automatically coupled with an RFID reader, the systems and methods of the present description may further include an RFID tag, such as a passive RFID tag, which may be manually activated, e.g., coupled upon a manual action, by a human or machine in order to cause a transmission of a data signal from the RFID tag to one or more RFID readers. A manually activated RFID tag may include physical or virtual switches that may close a circuit within the RFID tag and thereby permit the RFID tag to function as a data transmitter in the presence of an electric or magnetic field. For example, a manually activated RFID tag may include capacitive elements that define a capacitor within the RFID tag, and may effectively close a circuit within the RFID tag when such elements detect bioelectricity from a user. The term "bioelectricity" generally refers to electrical charges or electric field gradients that may be stored within a living body, such as a human body, which contains blood and other matter having a variety of positively and negatively charged ions (e.g., sodium, chloride and others). Bioelectricity within a body may cause a change in capacitance of such elements in a vicinity of a location touched by the body (e.g., a digit such as a finger or thumb), due to disruptions in electrical fields caused by the body's presence, thereby further causing a change in the time constant of the RFID tag, and a discharge of the capacitor in an amount that may be defined as a function of the resistance of the capacitive elements.

According to some embodiments, such capacitive elements may be formed into a layered stack or may include a substantially linear or planar gap or break, and may be covered with a flexible protective layer formed from one or more plastics or rubbers (e.g., acrylics, vinyls, polyurethanes or the like), or other like materials. The protective layer may be adhered to one or more capacitive elements of an RFID circuit, which may include elements formed from a conductive material such as aluminum, copper, silicon or indium tin oxide that are separated by an air gap. When a user touches a protective layer of an RFID tag with a finger, which is a bioelectric conductor, a change in the effective capacitance (on the order of approximately one picofarad) between the elements, which are also conductors, in a vicinity of a point or points of contact with the protective layer, is introduced. Such contact forms a conductive bridge across the elements, thereby causing disruptions in electrical fields in the vicinity of one or more of the elements, and further causing an internal current flow through the RFID tag circuit.

In addition to capacitive elements, a circuit of an RFID tag may include other components for enabling a manual actuation thereof by a human or a machine, including one or more substantially planar conductive elements that may be separated by an air gap. Such an air gap between the conductive elements defines an open switch within the circuit of the RFID tag, which may also be covered with a flexible protective layer that may be formed from one or more plastics, rubbers or other like materials. When a user contacts an external surface of the RFID tag corresponding to the air gap, e.g., the flexible protective layer over the air gap, at least two of the conductive elements are placed in contact with one another, thereby bridging the air gap between the conductive elements and closing the open switch. Subsequently, an internal current flow through the RFID tag circuit is enabled. Because the bridging of the air gap and the closure of the open switch is registered by manually driven electrical contact, a manually activated RFID tag including substantially planar conductive elements does not require bioelectricity in order to operate properly, and a user may interact with the RFID tag using not only his or her fingers or hands (which may be gloved or ungloved) but also a stylus, a pointer or another like object.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system, comprising:
    a container holding fixture adapted for removable placement on a moveable inventory cart that is separate from the container holding fixture, the container holding fixture comprising:
        a pair of elongate light rails, each elongate rail comprising:
            a groove on a bottom side comprising a light strip disposed therein; and
            a light window formed from a transparent material and configured to allow light from the light strip to emit therethrough;
        a pair of elongate dividers extending between the pair of elongate light rails, the pair of elongate dividers and the pair of elongate light rails defining a plurality of slots each configured to receive a container, the light window of each elongate rail associated with a particular slot of the plurality of slots and disposed between first ends of the pair of elongate dividers;
        at least one radio-frequency identification (RFID) antenna disposed below the particular slot;
        an RFID reader communicatively coupled to the RFID antenna and configured to read, via the RFID antenna, RFID tags; and
        a computing device communicatively coupled to the RFID reader and the light strip, and configured to at least:
            instruct the RFID reader to read the RFID tags via the RFID antenna; and
            cause the light strip to selectively emit light through the light window.

2. The system of claim 1, wherein the moveable inventory cart comprises an upper surface, and the moveable inventory cart is configured to receive and retain the container holding fixture, with the container holding fixture resting on the upper surface.

3. The system of claim 2, further comprising a mobile power source in electrical communication with the RFID reader, the light strip of each elongate rail, and the computing device.

4. The system of claim 1, wherein:
the container holding fixture further comprises a plurality of horizontal layers comprising an upper horizontal layer, a middle horizontal layer, and a lower horizontal layer;
the pair of elongate light rails and the pair of elongate dividers are disposed in the upper horizontal layer;
the RFID reader and the computing device are disposed in the lower horizontal layer; and
the at least one RFID antenna is disposed within the middle horizontal layer located between the upper horizontal layer and the lower horizontal layer.

5. An apparatus, comprising:
a frame, comprising:
a first set of members spaced apart and oriented in a first direction, each member of the first set of members comprising an indicator area; and
a second set of members spaced apart and oriented in a second direction, at least two members of the second set of members extending between the first set of members to define a container receiving area, the frame adapted for removable placement on a moveable cart that is separate from the frame;
a sensing device disposed adjacent to the container receiving area and configured to detect movement of containers with respect to the container receiving area; and
a computing device communicatively coupled to the sensing device and configured to cause presentation of indicators within the indicator area of each member.

6. The apparatus of claim 5, wherein:
other members of the second set of members extend between the first set of members to define other container receiving areas; and
the apparatus further comprises other sensing devices disposed adjacent to the other container receiving areas, the other sensing devices respectively configured to detect movement of the containers with respect to the other container receiving areas.

7. The apparatus of claim 6, wherein:
each indicator area of the first set of members is associated with the container receiving area; and
the at least one member of the first set of members comprises other indicator areas that are respectively associated with the other container receiving areas.

8. The apparatus of claim 5, wherein the sensing device comprises at least one of a radio-frequency identification (RFID) sensing device, a weight sensing device, or an optical sensing device.

9. The apparatus of claim 5, wherein:
the sensing device is a radio-frequency identification (RFID) antenna; and
the apparatus further comprises an RFID reader communicatively coupled to the RFID antenna and the computing device, the RFID reader configured to cause the RFID antenna to detect the movement of the containers with respect to the container receiving area by at least:
detecting the presence of RFID tags attached to the containers; or
detecting the absence of the RFID tags.

10. The apparatus of claim 5, wherein:
each member of the first set of members comprises an area configured to receive a light source; and
each indicator area of the first set of members comprises a light window formed from a transparent material and configured to allow light from the light source to emit therethrough.

11. The apparatus of claim 10, wherein the light window is configured to allow the light from the light source to emit laterally and upwardly.

12. The apparatus of claim 10, wherein:
the light source comprises a light-emitting diode (LED) light strip capable of emitting light in a plurality of different colors; and
the computing device is communicatively coupled to the LED light strip and configured to cause the LED light strip to selectively emit light in the plurality of different colors.

13. The apparatus of claim 5, further comprising a device support structure comprising a top surface and an interior chamber, the top surface configured to support the frame, the sensing device and the computing device disposed within the interior chamber.

14. The apparatus of claim 13, wherein:
the frame is releasably coupled to the device support structure; and
the frame and the device support structure are configured to rest on an upper surface of the moveable cart.

15. The apparatus of claim 5, wherein:
each of the first set of members comprises an inward sloping face; and
the at least two members of the second set of members extend between respective inward sloping faces of the first set of members.

16. A method, comprising:
providing a fixture that comprises:
a first set of members spaced apart and oriented in a first direction, each member of the first set of members comprising an indicator area;
a second set of members spaced apart and oriented in a second direction, at least two members of the second set of members extending between the first set of members to define a plurality of container receiving areas; and
a device support structure comprising an upper surface, a lower surface, and an interior cavity, the first set of members and the second set of members resting on the upper surface, the interior cavity comprising at least one of a sensing device, a reader device, or a computing device;
placing the fixture on a moveable inventory cart such that the lower surface of the device support structure rests on the moveable inventory cart, the moveable inventory cart comprising a power supply; and
connecting the power supply to at least one of the sensing device, the reader device, or the computing device.

17. The method of claim 16, further comprising securing the fixture to the moveable inventory cart.

18. The method of claim 16, wherein the moveable inventory cart comprises a set of wheels and a handle, the moveable inventory cart moveable by a human pushing or pulling the moveable inventory cart via the handle.

19. The method of claim 16, wherein a first container receiving area of the plurality of container receiving areas is configured to receive a removable container that is filled or emptied with items as the moveable inventory cart is moved throughout an inventory storage system.

20. The method of claim 19, wherein indications are presented in the indicator area of each member to selectively identify the removable container from other removable containers held by other container receiving areas of the plurality of container receiving areas.

* * * * *